(12) United States Patent
Takahashi et al.

(10) Patent No.: US 9,583,784 B2
(45) Date of Patent: Feb. 28, 2017

(54) POWER STORAGE DEVICE AND METHOD FOR MANUFACTURING THE SAME

(71) Applicant: SEMICONDUCTOR ENERGY LABORATORY CO., LTD., Atsugi-shi, Kanagawa-ken (JP)

(72) Inventors: Minoru Takahashi, Nagano (JP); Ryota Tajima, Kanagawa (JP)

(73) Assignee: SEMICONDUCTOR ENERGY LABORATORY CO., LTD., Kanagawa-ken (JP)

( * ) Notice: Subject to any disclaimer, the term of this patent is extended or adjusted under 35 U.S.C. 154(b) by 156 days.

(21) Appl. No.: 13/858,237

(22) Filed: Apr. 8, 2013

(65) Prior Publication Data
US 2013/0273405 A1    Oct. 17, 2013

(30) Foreign Application Priority Data
Apr. 17, 2012 (JP) ................. 2012-094092

(51) Int. Cl.
*H01M 10/04* (2006.01)

(52) U.S. Cl.
CPC ........... *H01M 10/0436* (2013.01); *H01M 2010/0495* (2013.01); *H01M 2300/0082* (2013.01); *Y10T 29/49108* (2015.01)

(58) Field of Classification Search
CPC ................ H01M 10/0436; H01M 6/40
See application file for complete search history.

(56) References Cited

U.S. PATENT DOCUMENTS 9,178,189 B2    11/2015  Abe et al.
2004/0185334 A1*  9/2004  Iwamoto ............ H01M 4/131
                                                      429/127
(Continued)

FOREIGN PATENT DOCUMENTS

CN    101241977 A    8/2008
CN    101743653 A    6/2010
(Continued)

OTHER PUBLICATIONS

Chinese Office Action (Application No. 201310133450.3) Dated Jun. 2, 2016.

*Primary Examiner* — Muhammad Siddiquee
(74) *Attorney, Agent, or Firm* — Nixon Peabody LLP; Jeffrey L. Costellia

(57) ABSTRACT

To provide a flexible, highly reliable, and sheet-like power storage device. The power storage device including a flexible substrate; a positive electrode lead and a negative electrode lead over the flexible substrate; and a plurality of power storage elements over the flexible substrate. The plurality of power storage elements each includes a stack body including a sheet-like positive electrode; a sheet-like negative electrode; and an electrolyte therebetween in an exterior body. An edge portion of the sheet-like positive electrode which extends to the outside of the exterior body is electrically connected to the positive electrode lead through a positive electrode tab provided for the exterior body. An edge portion of the sheet-like negative electrode which extends to the outside of the exterior body is electrically connected to the negative electrode lead through a negative electrode tab provided for the exterior body.

16 Claims, 13 Drawing Sheets

(56) References Cited

U.S. PATENT DOCUMENTS

| | | | |
|---|---|---|---|
| 2008/0008927 A1* | 1/2008 | Lee | H01M 2/1646 429/61 |
| 2009/0023061 A1* | 1/2009 | Ogg et al. | 429/162 |
| 2010/0081049 A1* | 4/2010 | Holl | H01M 4/0404 429/162 |
| 2012/0288745 A1* | 11/2012 | Payne | H01M 2/08 429/159 |
| 2012/0288746 A1* | 11/2012 | Abe et al. | 429/162 |
| 2013/0095366 A1 | 4/2013 | Ogg et al. | |
| 2013/0101882 A1 | 4/2013 | Ogg et al. | |
| 2013/0101890 A1 | 4/2013 | Ogg et al. | |
| 2013/0171490 A1* | 7/2013 | Rothkopf et al. | 429/120 |

FOREIGN PATENT DOCUMENTS

| | | | |
|---|---|---|---|
| EP | 2518790 A | 10/2012 | |
| EP | 2521200 A | 11/2012 | |
| EP | 2521201 A | 11/2012 | |
| EP | 2528133 A | 11/2012 | |
| JP | 2002-343340 | 11/2002 | |
| JP | 2007-123081 | 5/2007 | |
| KR | 1020000051779 | * 8/2000 | H01M 2/02 |
| WO | WO-2008/100533 | 8/2008 | |
| WO | WO-2011/089965 | 7/2011 | |

* cited by examiner

POWER STORAGE DEVICE AND METHOD FOR MANUFACTURING THE SAME

BACKGROUND OF THE INVENTION

1. Field of the Invention

The present invention relates to a power storage device and a method for manufacturing the power storage device.

2. Description of the Related Art

In recent years, lithium secondary batteries as power storage devices have been widely used as power supplies of consumer electronic devices such as game machines and information terminals typified by mobile phones and smartphones.

For such electronic devices, the need of power storage devices having not only long life and high capacity but also sheet-like shapes and flexibility for reductions in weight and size and a greater freedom for design of outer shapes has been increased. Flexible sheet-like power storage devices can be provided even for curved or bent portions and thin portions such as band portions of wristwatches, clothes, and thin electric alliances.

Lithium secondary batteries which are conventional non-aqueous secondary batteries each generally include positive electrodes and negative electrodes; the positive electrodes each include a positive electrode current collector made of sheet-like aluminum or the like and a positive electrode mix which includes a positive electrode active material capable of occluding and releasing lithium ions and which is applied to both surfaces of the positive electrode current collector, and the negative electrodes each include a negative electrode current collector made of sheet-like copper or the like and a negative electrode mix which includes a negative electrode active material capable of occluding and releasing lithium ions and which is applied to both surfaces of the negative electrode current collector. The positive electrodes and the negative electrodes are rolled with a separator interposed therebetween to form a rolled body, a positive electrode tab and a negative electrode tab are connected to given portions of the positive electrodes and the negative electrodes, and a nonaqueous electrolytic and the rolled body where the tabs are connected to the given portions of the positive electrode and the negative electrode are sealed in an exterior body with a certain shape such as a cylindrical shape, a square shape, or a coin shape. Although being flexible members, the positive electrode, the separator, and the negative electrode have fixed forms and completely lose their flexibility, after the rolled body is formed and sealed in a container. Thus, a power storage device cannot have flexibility of being curved or bent and it is difficult to provide a power storage device for a curved or bent portion of an electronic device.

Therefore, for example, a solid secondary battery such as the solid secondary battery disclosed in Patent Document 1 has been actively researched. Such a solid secondary battery has a structure where an inorganic solid electrolyte or an organic solid electrolyte is substituted for a conventional nonaqueous electrolyte. Specifically, a positive electrode active material, a solid electrolyte, a negative electrode active material, and a negative electrode current collector are provided over a positive electrode current collector and the whole is made to be thin and have flexibility.

REFERENCE

Patent Document

[Patent Document 1] Japanese Published Patent Application No. 2007-123081

SUMMARY OF THE INVENTION

However, such a solid secondary battery has a problem in that an electrolyte layer also needs to be thin, so that a positive electrode and a negative electrode are likely to be short-circuited when the solid secondary battery is curved or bent. In particular, a solid secondary battery is wholly formed using solids and thus flaking of films and cracks in films are caused due to repeated bending of the battery. For this reason, it is not easy to form the solid secondary battery as a sheet-like battery.

Further, solid electrolytes used for solid secondary batteries have various problems and thus have not yet been in practical use.

In view of the foregoing, an object of one embodiment of the present invention is to provide a flexible, highly reliable, and sheet-like power storage device which does not use a solid secondary battery.

According to one embodiment of the present invention, a power storage device which has flexibility as a whole by provision of a plurality of non-flexible power storage elements over a flexible substrate is achieved.

One embodiment of the present invention is a power storage device including a flexible substrate; a positive electrode lead which is provided for the flexible substrate; a negative electrode lead which is provided for the flexible substrate; and a plurality of power storage elements which are arranged two-dimensionally and regularly over the flexible substrate. The plurality of power storage elements each include a stack body including a sheet-like positive electrode; a sheet-like negative electrode; and an electrolyte between the sheet-like positive electrode and the sheet-like negative electrode at least in an exterior body. An edge portion of the sheet-like positive electrode which extends to the outside of the exterior body is electrically connected to the positive electrode lead through a positive electrode tab which is provided for the exterior body. An edge portion of the sheet-like negative electrode which extends to the outside of the exterior body is electrically connected to the negative electrode lead through a negative electrode tab which is provided for the exterior body.

Another embodiment of the present invention is a method for manufacturing a power storage device including steps of stacking a sheet-like positive electrode and a sheet-like negative electrode with an electrolyte interposed therebetween in each of a plurality of depressed portions which are provided two-dimensionally and regularly over a substrate; pressing and molding a stack body including the sheet-like positive electrode and the sheet-like negative electrode with the electrolyte interposed therebetween in each of the plurality of depressed portions by applying pressure and heat to a lid which is provided over the substrate ; dividing the substrate and the lid into a plurality of parts so that edge portions of the sheet-like positive electrode and the sheet-like negative electrode are exposed; forming a plurality of power storage elements each including the stack body by providing a positive electrode tab at the exposed edge portion of the sheet-like positive electrode and providing a negative electrode tab at the exposed edge portion of the sheet-like negative electrode; arranging the plurality of power storage elements over a flexible substrate two-dimensionally and regularly; and electrically connecting the positive electrode tab to a positive electrode lead provided for the flexible substrate and electrically connecting the negative electrode tab to a negative electrode lead provided for the flexible substrate.

For pressing and molding the stack body together with the exterior body and the lid, light may be used instead of heat. In other words, for the lid, a photocurable resin may be used other than a thermoplastic resin or a thermosetting resin, and alternatively, a resin having properties of both of a thermosetting resin and a photocurable resin may be used.

In the power storage device having a structure described above, although each of the power storage elements does not have flexibility, the substrate where the power storage elements are provided is formed using a material having flexibility, and thus the power storage device has flexibility as a whole and can be curved and bent. Further, each of the power storage elements is sealed with the exterior body and the lid, and thus has high reliability with respect to curvature and bend of the power storage device. Further, each of the power storage elements has high resistance against entry of a contaminant from the outside. Accordingly, a highly reliable power storage device can be manufactured.

One embodiment of the present invention provides a flexible, highly reliable, and sheet-like power storage device.

DETAILED DESCRIPTION OF THE INVENTION

Figure 1A:
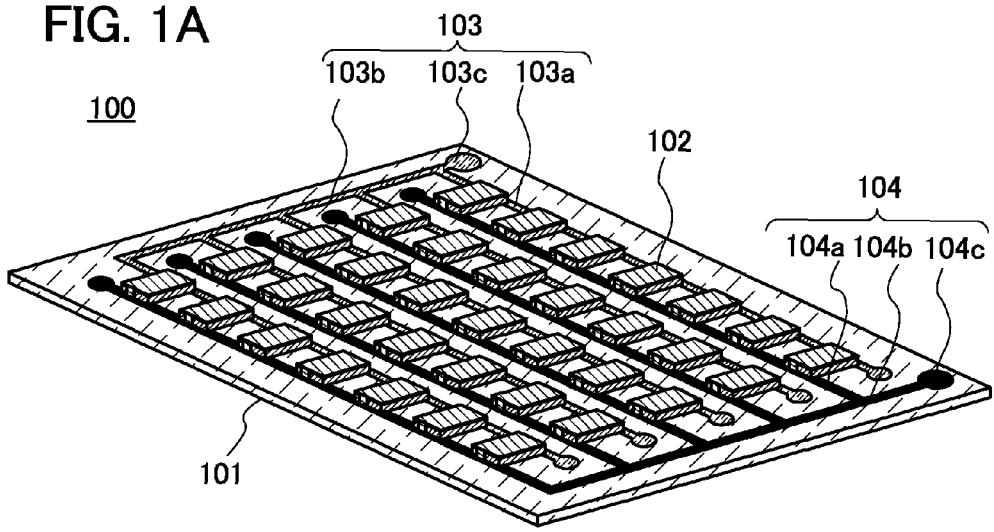
FIGS. 1A to 1D are views illustrating a power storage device.

Hereinafter, embodiments will be described with reference to drawings. However, the embodiments can be implemented with various modes. It will be readily appreciated by those skilled in the art that modes and details can be changed in various ways without departing from the spirit and scope of the present invention. Thus, the present invention should not be interpreted as being limited to the following description of the embodiments.

Note that in each drawing described in this specification, the size, the film thickness, or the region of each component is exaggerated for clarity in some cases. Therefore, embodiments of the present invention are not limited to such scales in the drawings.

[Embodiment 1]

In this embodiment, a flexible and highly reliable power storage device is described with reference to FIGS. 1A to 1D, FIG. 2, and FIG. 3. In this embodiment, a lithium secondary battery is used as an example of a power storage device.

Note that a lithium secondary battery refers to a secondary battery where lithium ions are used as carrier ions. Examples of carrier ions which can be used instead of lithium ions include alkali-metal ions such as sodium ions and potassium ions; alkaline-earth metal ions such as calcium ions, strontium ions, and barium ions; beryllium ions; magnesium ions; and the like.

FIG. 1A is a bird's-eye schematic view illustrating a power storage device 100 which is described in this embodiment. The power storage device 100 includes a flexible substrate 101, power storage elements 102, a positive electrode lead 103, and a negative electrode lead 104.

As the flexible substrate 101, a substrate made of a resin material can be used. The use of a resin material enables the substrate to have flexibility and to be reduced in weight while high strength is maintained as compared to the case of using a metal or glass as a material for the flexible substrate 101; consequently, reduction in weight of the power storage device can be achieved, so that such a power storage device is preferably applied to especially a portable electronic device.

As a material for the flexible substrate 101, plastic such as polyethersulfone (PES), polycarbonate (PC), PET (polyethylene terephthalate) or PEN (polyethylene naphthalate), polyarylate, polypropylene, or polyester can be used.

Figure 1B:
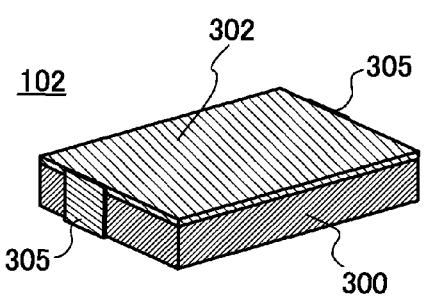
Figure 1C:
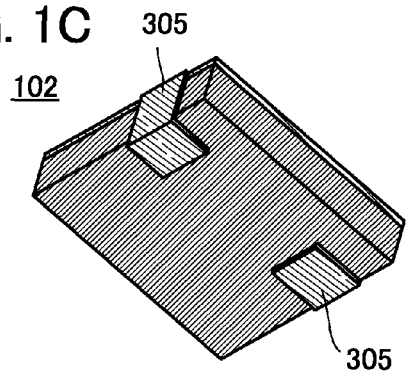

FIGS. 1B and 1C are schematic views illustrating the power storage element 102. FIG. 1B is a perspective view of the power storage element 102 which is seen from above, and FIG. 1C is a perspective view of the power storage element 102 which is seen from beneath. The power storage element 102 includes an exterior body 300 having a rectangular parallelepiped shape with a depressed portion, a lid 302 over the exterior body 300, and tabs 305 which are each provided from a side surface to a bottom surface of the exterior body 300 so as to have an L shape. The tab 305 is a terminal for inputting and outputting power to/from the power storage element 102 and is formed using a conductive material. One power storage element includes at least two tabs, one of which serves as a positive electrode tab, and the other of which serves as a negative electrode tab. Although not illustrated, a stack body of electrodes which stores power is sealed in the power storage element 102.

Note that although the drawings illustrate the power storage element 102 having a rectangular parallelepiped shape for convenience, the shape of the power storage element 102 is not limited thereto; the power storage element 102 can be designed as appropriate to have a shape with its corner or edge chamfered, a cube, or the like unless it departs from the spirit of the present invention. Further, a portion of the exterior body 300 where the tab 305 is provided is not limited to a portion from the side surface to the bottom surface of the exterior body 300 and can be a given portion of the exterior body 300, such as only the side surface or only the bottom surface.

Figure 1D:
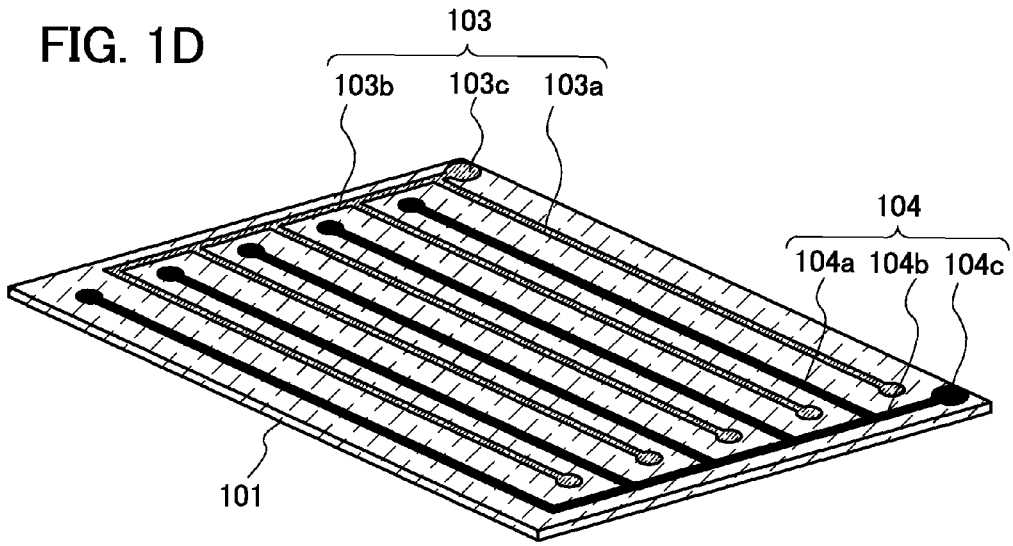

FIG. 1D is a view illustrating the power storage device before the power storage elements 102 are provided. The flexible substrate 101 provided with the positive electrode lead 103 and the negative electrode lead 104, which are formed using a conductive material, serves as a circuit board. The positive electrode lead 103 includes a plurality of leads 103a for connection with the positive electrode tabs of the power storage elements 102; a bus line 103b which is connected with the plurality of leads 103a; and a terminal portion 103c which is connected with the bus line 103b and performs electrical connection with the outside of the power storage device 100. The leads 103a, the bus line 103b, and the terminal portion 103c can be formed as a continuous wiring pattern. Alternatively, after being separately formed as respective patterns, the leads 103a, the bus line 103b, and the terminal portion 103c may be electrically connected using another wiring pattern.

Any conductive material can be used for the positive electrode lead 103 and the negative electrode lead 104; however, the positive electrode lead 103 and the negative electrode lead 104 are curved or bent together with the flexible substrate 101, and accordingly, the positive electrode lead 103 and the negative electrode lead 104 are preferably formed using a material having high ductility and malleability. For example, a metal such as stainless steel, gold, platinum, zinc, iron, copper, aluminum, or titanium, or an alloy thereof can be used.

The negative electrode lead 104 has the same structure as the positive electrode lead 103 described above. In other words, the negative electrode lead 104 includes a plurality of leads 104a for connection with negative electrode tabs of the plurality of power storage elements 102; a bus line 104b which is connected with the plurality of leads 104a; and a terminal portion 104c which is connected with the bus line 104b and performs electrical connection with the outside of the power storage device 100.

The bus line 103b and the bus line 104b are placed in positions opposed to each other. The plurality of leads 103a extending from the bus line 103b are provided in parallel to each other. Similarly, the plurality of leads 104a extending from the bus line 104b are also provided in parallel to each other. Further, the plurality of leads 103a and the plurality of leads 104a are provided in parallel to each other. Accordingly, the positive electrode lead 103 and the negative electrode lead 104 which have comb-like shapes are provided to engage with each other.

In FIG. 1D, the positive electrode lead 103 and the negative electrode lead 104 are each illustrated as a pattern formed over the flexible substrate 101. However, the positive electrode lead 103 and the negative electrode lead 104 may be provided in the flexible substrate 101. In this case, the terminal portion 103c and the terminal portion 104c which perform electrical connection with the outside of the power storage device 100 and the leads 103a and the leads 104a which perform electrical connection with the respective power storage elements 102 partly need to be exposed. Note that a metal thin film of gold (Au) or the like or oxide semiconductor thin film of ITO or the like may be provided over the exposed parts for the purpose of prevention of the oxidation, maintenance of the mechanical strength, improvement in adhesion with an object of electrical connection, or the like.

Alternatively, as the flexible substrate 101 having the positive electrode lead 103 and the negative electrode lead 104, a flexible printed circuit (FPC) may be used. A flexible printed circuit has a structure in which an adhesive layer is formed over a film-like insulator and a conductive thin film used as a wiring is formed thereover. The flexible printed circuit excluding a terminal portion and a soldering portion is covered and protected with an insulator. Since a flexible printed circuit has flexibility and can be deformed, it can be used as the flexible substrate 101 of the power storage device 100 of the present invention, which has the positive electrode lead 103 and the negative electrode lead 104.

In the case of using a flexible printed circuit as the flexible substrate 101 having the positive electrode lead 103 and the negative electrode lead 104, polyimide or a solder resist can be used for the film-like insulator, and copper can be used for the conductive thin film.

The plurality of power storage elements 102 are arranged two-dimensionally and regularly over such a flexible substrate 101 having the positive electrode lead 103 and the negative electrode lead 104 that is illustrated in FIG. 1D (see FIG. 1A). In FIG. 1D, as described above, the positive electrode lead 103 and the negative electrode lead 104 which have comb-like shapes are provided to engage with each other. The power storage element 102 is provided so as to be in contact with the lead 103a and the lead 104a adjacent to the lead 103a so that connection with the lead 103a and the lead 104a can be obtained. One of the two tabs 305 which are provided from the side surface to the bottom surface of the power storage element 102 is electrically connected with the lead 103a, and the other is electrically connected with the lead 104a.

A mounting technology such as SMT (surface mount technology) which is used for connection between an IC chip and a circuit board can be used for electrical connection between the tab 305 and the lead 103a and between the tab 305 and the lead 104a. A solder, a solder paste, a conductive paste, or the like may be used for the connection. Further, an anisotropic conductive paste, an anisotropic conductive film, and a resin material including metal particles may be used according to the process temperature.

In this manner, the plurality of power storage elements 102 are electrically connected with the positive electrode lead 103 and the negative electrode lead 104, whereby the power storage device 100 having large capacitance can be formed. As illustrated in FIG. 1D, the positive electrode lead 103 and the negative electrode lead 104 which have comb-like shapes are provided to engage with each other, whereby all the power storage elements 102 can be connected in parallel, so that the power storage device 100 can have a higher capacity.

Note that the power storage device having high output may be obtained by connecting the power storage elements 102 in series. Alternatively, a given capacitance and a given output can be obtained by combining a series connection and a parallel connection of the power storage elements 102. Accordingly, the patterns of the positive electrode lead 103 and the negative electrode lead 104 can be designed freely and are not limited to the pattern having a comb-like shape described above. The positive electrode lead 103, the negative electrode lead 104 and the storage elements may be covered with a resin or a protective film except the terminal portion 103c for the passivation.

Figure 2:
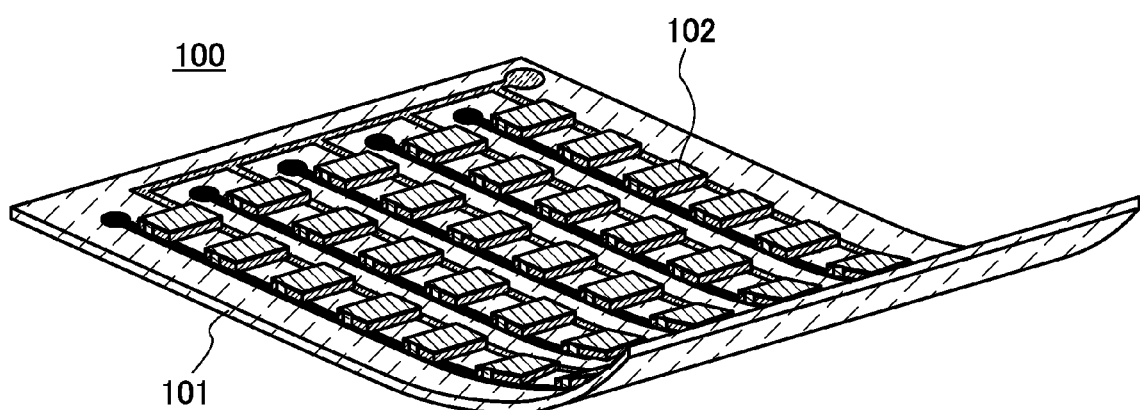
FIG. 2 is a view illustrating a power storage device.

FIG. 2 is a schematic view illustrating the power storage device 100 part of which is curved. The flexible substrate 101 has flexibility and thus can be deformed. The positive electrode lead and the negative electrode lead which are provided over the flexible substrate are deformed with deformation of the flexible substrate 101. On the other hand, the power storage elements 102 which are arranged over the flexible substrate 101 do not have flexibility and thus are not curved. When the size of the power storage element 102 is small with respect to the size of the flexible substrate 101, a region of the flexible substrate 101 where the power storage elements 102 are not provided is deformed, whereby the power storage device 100 can be curved or bent even when the power storage elements 102 are not deformed.

Figure 3:
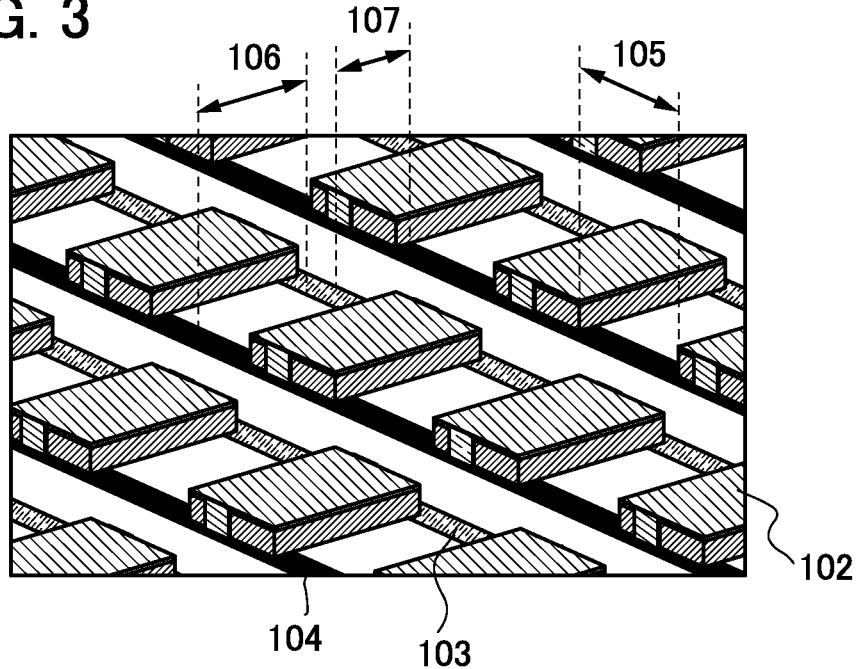
FIG. 3 is a view illustrating a power storage device.

In other words, the power storage device 100 can have flexibility by including the region of the flexible substrate 101 where the power storage elements 102 are not provided. Note that in FIG. 2, the power storage device 100 is curved along a direction parallel (or perpendicular) to the arrangement of the power storage elements 102; however, the direction along which the power storage device 100 is curved is not limited thereto, and the power storage device 100 can be curved or bent in a given direction. A movable region of the region of the flexible substrate 101 where the power storage elements 102 are not provided depends on the area of the flexible substrate 101 which is occupied by the power storage elements 102 (i.e., the size of the power storage elements), the height of the power storage elements 102, a material of the flexible substrate 101, the direction along which the power storage device 100 is curved, and the like. As illustrated in FIG. 3, a distance between the positive electrode lead 103a and the negative electrode lead 104a and a distance between the adjacent power storage elements 102 are designed as appropriate, whereby the movable region of the power storage device 100 can be set. Specifically, in FIG. 3, a distance 105 between the adjacent power storage elements 102, a distance 106 and a distance 107 between the positive electrode lead 103a and the negative electrode lead 104a which are adjacent to each other, and the like can be set as appropriate.

As described above, the positive electrode lead 103, the negative electrode lead 104, and the power storage elements 102 are provided over the flexible substrate 101 as appropriate, whereby the power storage device 100 having flexibility can be manufactured.

Note that in FIG. 1A, only a power storage region is formed by providing the plurality of power storage elements 102 over the flexible substrate 101; however, an electric circuit for preventing overcharge or overdischarge, or the like (not illustrated) may be further provided over the flexible substrate 101. In this case, by mounting a plurality of LSIs which are included in the electric circuit and each have a package structure, in a manner similar to that of the power storage elements 102, the whole power storage device 100 including the electric circuit can have flexibility.

As such an electric circuit, a circuit for collecting data on a cell voltage or a cell temperature, a circuit for controlling a cell balancer, a circuit for managing a battery deterioration state, a circuit for calculating the remaining battery level (state of charge (SOC)), a circuit for controlling failure detection, or a circuit other than the above circuits can be provided in addition to a monitoring circuit for preventing overcharge or overdischarge.

This embodiment can be implemented in combination with any of the other embodiments as appropriate.

[Embodiment 2]

In this embodiment, an example of a method for manufacturing the power storage element included in the flexible power storage device which is described in Embodiment 1 is described with reference to FIGS. 4A and 4B, FIGS. 5A and 5B, FIG. 6, FIGS. 7A to 7C, FIGS. 8A to 8E, and FIGS. 9A to 9C.

(Structure of Stack Body and Manufacturing Method Thereof)

Figure 4A:
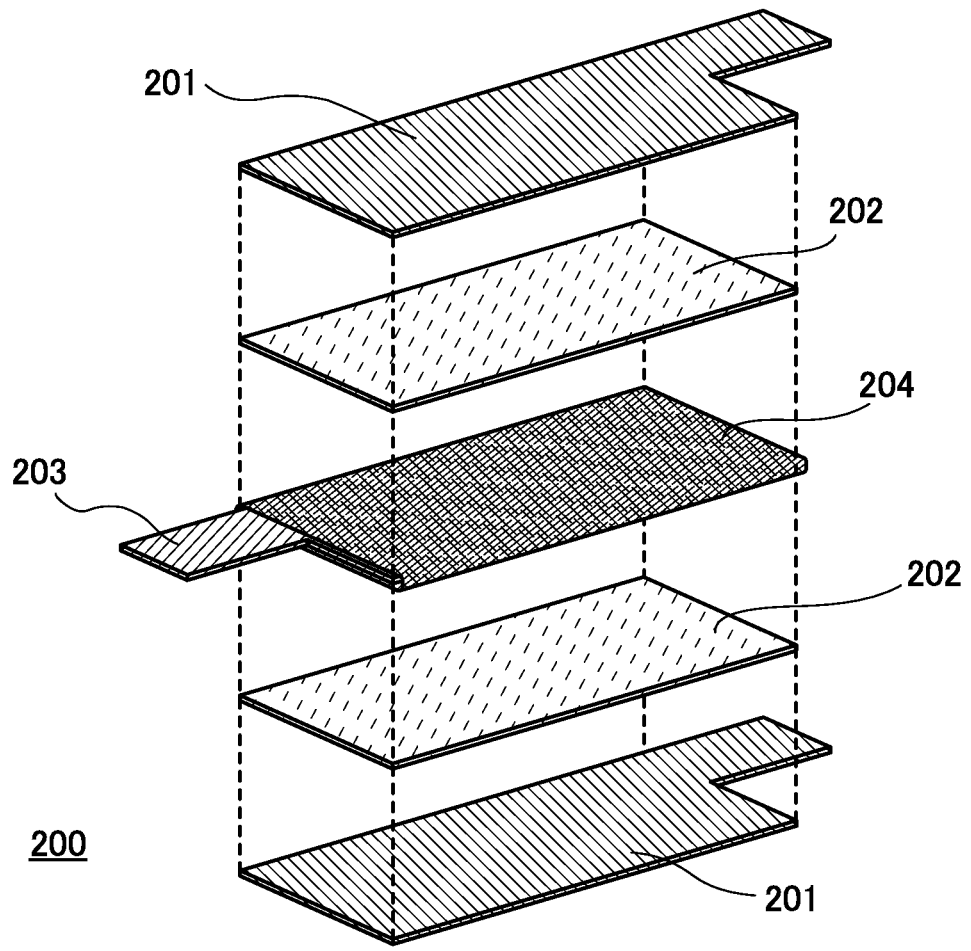
FIGS. 4A and 4B are views illustrating a stack body.
Figure 4B:
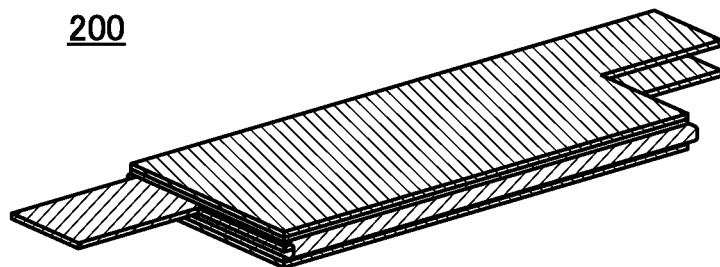

The power storage element 102 described above includes a stack body 200 for storing power in the exterior body 300. As illustrated in FIG. 4A, the stack body 200 includes a sheet-like positive electrode 201, a sheet-like electrolyte 202, and a sheet-like negative electrode 203. Further, the negative electrode 203 is surrounded by a bag-like separator 204. Furthermore, a part of the positive electrode 201 and part of the negative electrode 203 are extended outside for connection with the tabs 305 each of which is provided on the side surface and the bottom surface of the power storage element 102. The positive electrode 201 excluding the extended part, the electrolyte 202, and the negative electrode 203 excluding the extended part have substantially the same sheet-like shape. As illustrated in FIG. 4B, the stack body 200 in which the positive electrode 201 excluding the extended part, the electrolyte 202, and the negative electrode 203 excluding the extended part have substantially the same shape is formed, whereby the stack body 200 can be included in a depressed portion of the exterior body which is described later.

The electrolyte 202 is preferably a solid polymer electrolyte. A solid polymer electrolyte is a gel polymer electrolyte which is obtained by solidifying a liquid including carrier ions using a polymer (a high molecular material) and looks like a solid. When the electrolyte is brought into a quasi-solid state using such a gelled high molecular material, safety against liquid leakage and the like is improved. In addition, the power storage device can be thin and lightweight. Typical examples of gelled high-molecular materials include a silicone gel, an acrylic gel, an acrylonitrile gel, polyethylene oxide, polypropylene oxide, a fluorine-based polymer, and the like.

A material including carrier ions is used as a solute mixed with the high molecular material. As the solute, for example, one or plural lithium salts such as $LiClO_4$, $LiAsF_6$, $LiBF_4$, $LiPF_6$, $Li(C_2F_5SO_2)_2N$, $LiAlCl_4$, $LiSCN$, $LiBr$, $LiI$, $Li_2SO_4$, $Li_2B_{10}Cl_{10}$, $Li_2B_{12}Cl_{12}$, $LiCF_3SO_3$, $LiC_4F_9SO_3$, $LiC(CF_3SO_2)_3$, $LiC(C_2F_5SO_2)_3$, $LiN(CF_3SO_2)_2$, and $LiN(C_4F_9SO_2)(CF_3SO_2)$ can be used in an appropriate combination and in an appropriate ratio.

Note that when alkali metal ions other than lithium ions, alkaline-earth metal ions, beryllium ions, or magnesium ions are used for carrier ions, lithium in the above lithium salts for the electrolyte may be replaced with an alkali metal (e.g., sodium or potassium), an alkaline-earth metal (e.g., calcium, strontium, or barium), beryllium, or magnesium.

The separator 204 has a function of securing the ion conductivity between the positive electrode and the negative electrode by separating the positive electrode 201 and the negative electrode 203 and holding the electrolyte, or the like. For the separator 204, for example, a porous insulator of polypropylene, polytetrafluoroethylene, polyethylene, cellulose, polybutene, nylon, polyester, polysulfone, polyacrylonitrile, polyvinylidene fluoride, or the like can be used. Further, nonwoven fabric of a glass fiber or the like, or a diaphragm in which a glass fiber and a polymer fiber are mixed may also be used.

In FIG. 4A, the positive electrode 201, the electrolyte 202, the negative electrode 203 surrounded by the bag-like separator 204, the electrolyte 202, and the positive electrode 201 are stacked in this order from the bottom. With such a structure, structures of a battery can be formed in an upper portion and a lower portion using the negative electrode 203 as a common electrode.

Note that the stacked-layer structure of the stack body 200 is not limited thereto, and any structure can be employed as long as the stack body 200 has at least a structure in which the positive electrode 201, the electrolyte 202, and the negative electrode 203 are stacked in this order, or a structure in which the negative electrode 203, the electrolyte 202, and the positive electrode 201 are stacked in this order. Further, although the bag-like separator 204 is provided around the negative electrode 203 in FIG. 4A, it may be provided for the positive electrode 201. Furthermore, the shape of the separator 204 is not limited to a bag-like shape, and sheet-like separators may be provided between the positive electrode 201 and the electrolyte 202 and between the negative electrode 203 and the electrolyte 202.

Further, the number of layers in each of which the positive electrode 201 and the negative electrode 203 are stacked with the electrolyte 202 interposed therebetween may be two or more. In other words, the positive electrode 201 and the negative electrode 203 can be alternately stacked many times with the electrolyte 202 interposed therebetween, and the discharge capacity of the power storage element 102 can be increased in accordance with the number of stacked layers. Note that in the case where the number of the stacked layers is increased, it needs to be noted that the height of the power storage element 102 becomes higher.

A method for manufacturing the power storage element 102 is described below.

Figure 5A:
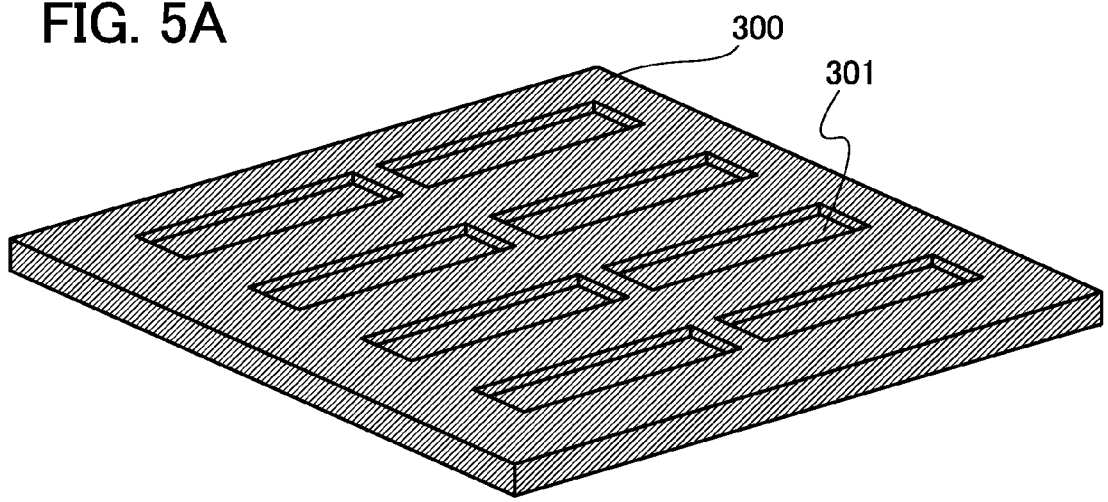
FIGS. 5A and 5B are views illustrating a method for manufacturing a power storage device.
Figure 5B:
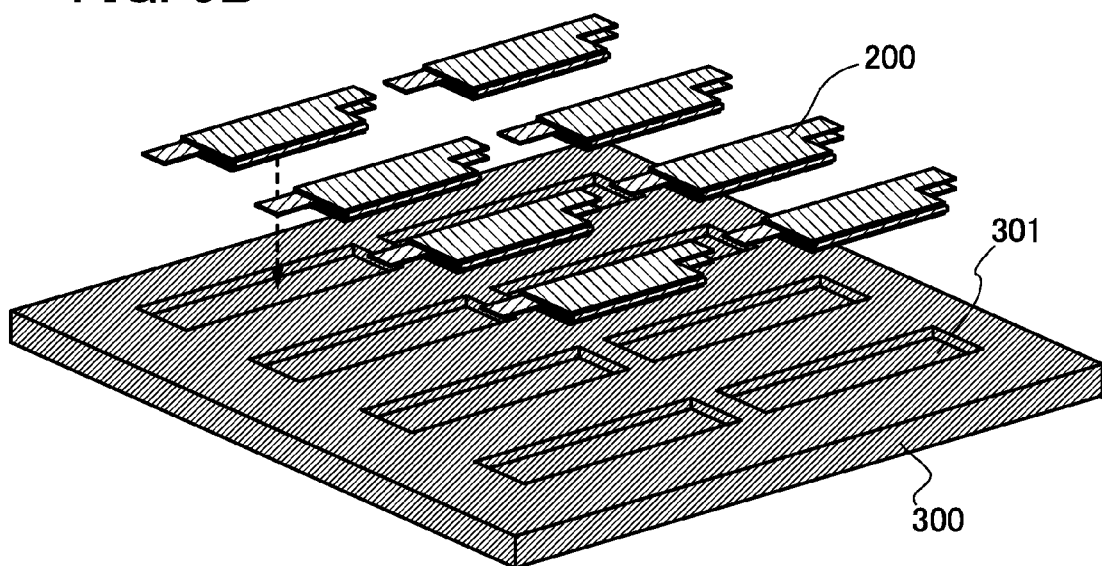
Figure 6:
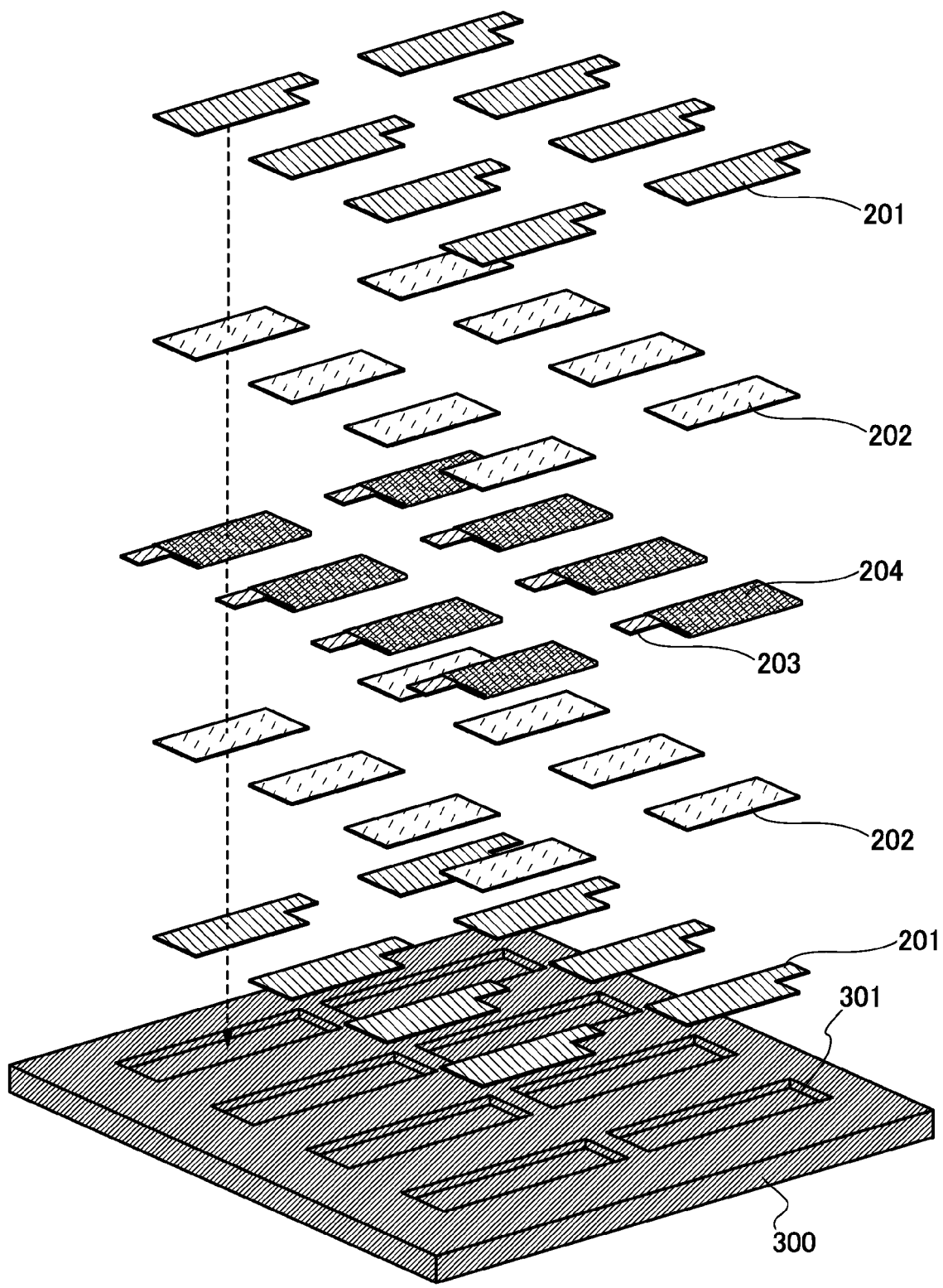
FIG. 6 is a view illustrating a method for manufacturing a power storage device.

FIG. 5A illustrates the exterior body 300 for sealing the stack body 200. Although the exterior body 300 is divided into parts each having a size corresponding to the size of the stack body 200 later, the exterior body 300 in the initial state has a plate shape and includes a plurality of depressed portions 301 which are arranged regularly. The arrangement of the plurality of depressed portions 301 is not limited to a matrix arrangement as illustrated in FIG. 5A and can be an appropriate arrangement. It is preferable to employ an arrangement with which division in a later step can be performed easily. Further, the size of the exterior body 300, the number of the depressed portions 301, and the distance between the adjacent depressed portions can be set freely; therefore, it is preferable to select conditions under which as high mass productivity as possible can be achieved.

The exterior body 300 has a function of protecting the stack body therein from stress generated when the power storage device 100 is curved or bent. In addition, the exterior body 300 has a function of protecting the stack body therein from moisture or contaminant. Accordingly, a material for the exterior body 300 is preferably a material with which these functions can be achieved and which can be divided together with the lid which is to be formed later. As such a material, a thermosetting resin such as a phenol resin, a melamine resin, an unsaturated polyester resin, an epoxy resin, or a diallyl phthalate resin can be used.

The stack body 200 described above is placed in the depressed portion 301 in the exterior body 300. The stack body 200 in which the positive electrode, the negative electrode, and the like are stacked may be manufactured in advance. Alternatively, the positive electrode and the like which are included in the stack body 200 may be each placed in the depressed portion 301 to manufacture the stack body 200 in the depressed portion (see FIG. 6). In each case, it is preferable that the planar shape of the depressed portion 301 be substantially the same as that of the stack body 200. The stack bodies 200 may be formed in the plurality of depressed portions 301 sequentially or concurrently.

Figure 7A:
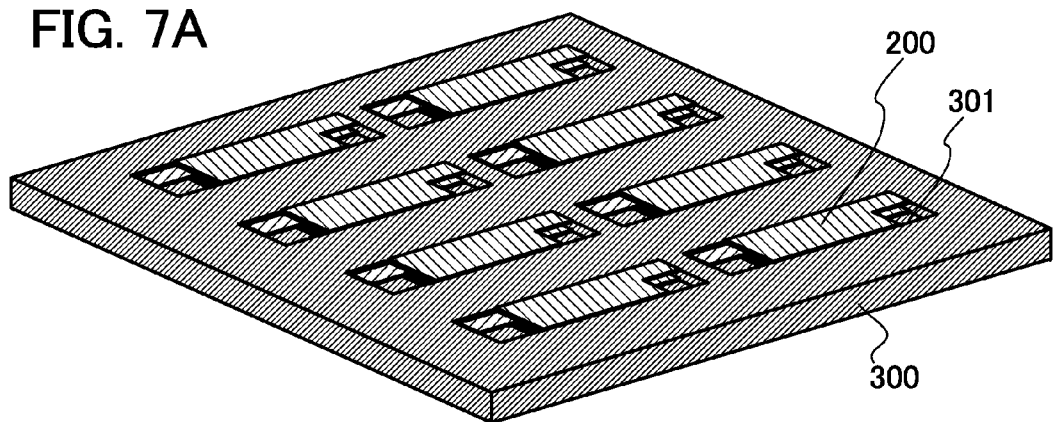
FIGS. 7A to 7C are views illustrating a method for manufacturing a power storage device.

FIG. 7A is a schematic view illustrating the exterior body 300 including the depressed portions 301 where the stack bodies 200 are placed as described above. In this state, the stack bodies 200 each have a thickness slightly larger than the depth of the depressed portion 301.

Figure 7B:
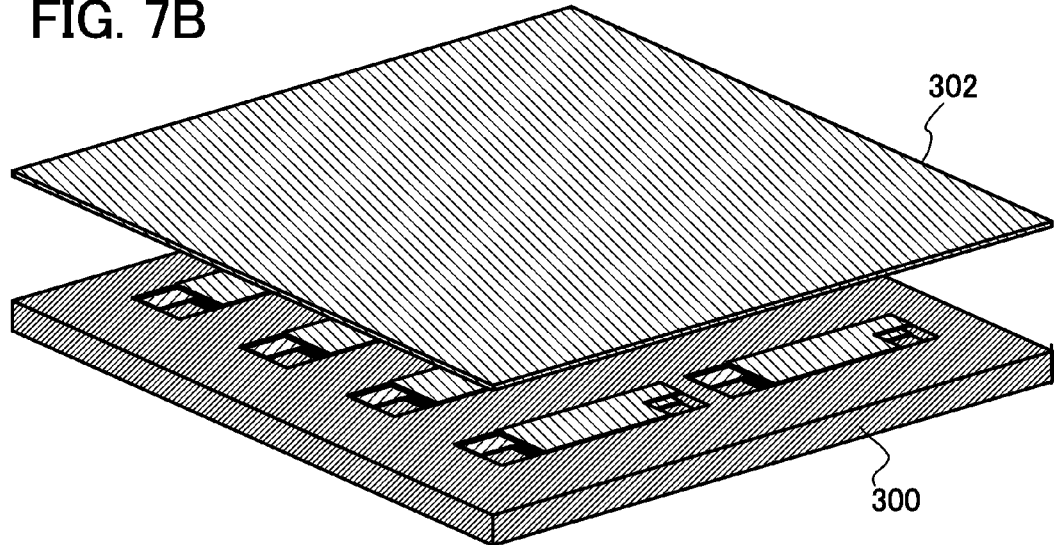
Figure 7C:
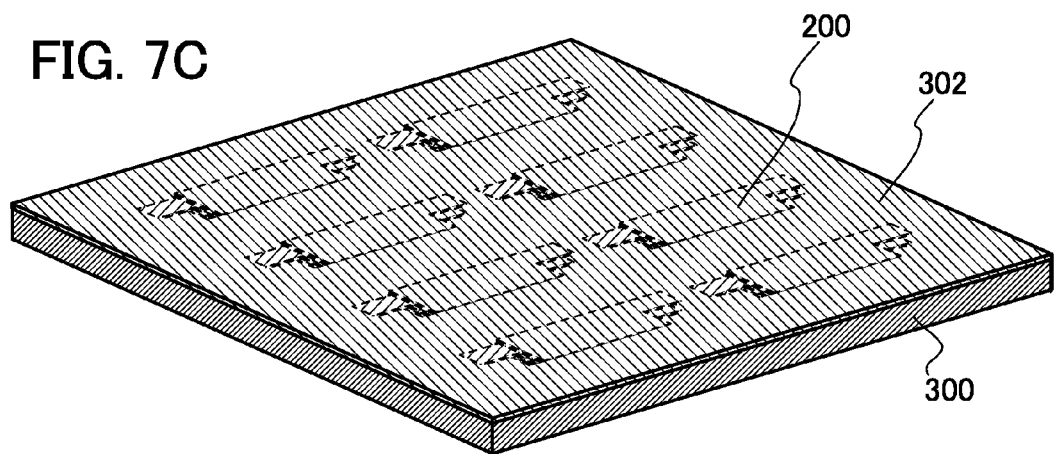

Next, as illustrated in FIGS. 7B and 7C, the lid 302 is provided over the exterior body 300 including the stack bodies 200 in the depressed portions 301.

As a material for the lid 302, a thermoplastic resin is preferably used in order to seal the stack bodies 200 in the exterior body 300. For example, polyethylene, polypropylene, a vinyl chloride resin, polyethylene terephthalate, or a vinylidene chloride resin can be used. A thermosetting resin or a photocurable resin can also be used. In this case, an adhesive layer may be provided between the exterior body 300 and the lid 302 so that the lid 302 can be adhered to the exterior body 300 at the time of sealing in a next step.

After that, heating is performed while pressure is applied from an upper portion of the lid 302, whereby part of the lid 302 is melted to be pressed and molded. The depressed portions 301 including the stack bodies 200 are filled with the part of the lid 302 which is melted, whereby the stack bodies 200 are sealed inside the exterior body 300 and the lid 302 without spaces between the exterior body 300 and the stack bodies 200 and between stack bodies 200 and the lid 302. Further, a filler (e.g., a desiccant agent, or an inert gas) may be placed in the depressed portions 301 in advance at the time of pressing and molding.

Through the above process, the stack bodies 200 can be sealed inside the exterior body 300 and the lid 302.

Figure 8A:
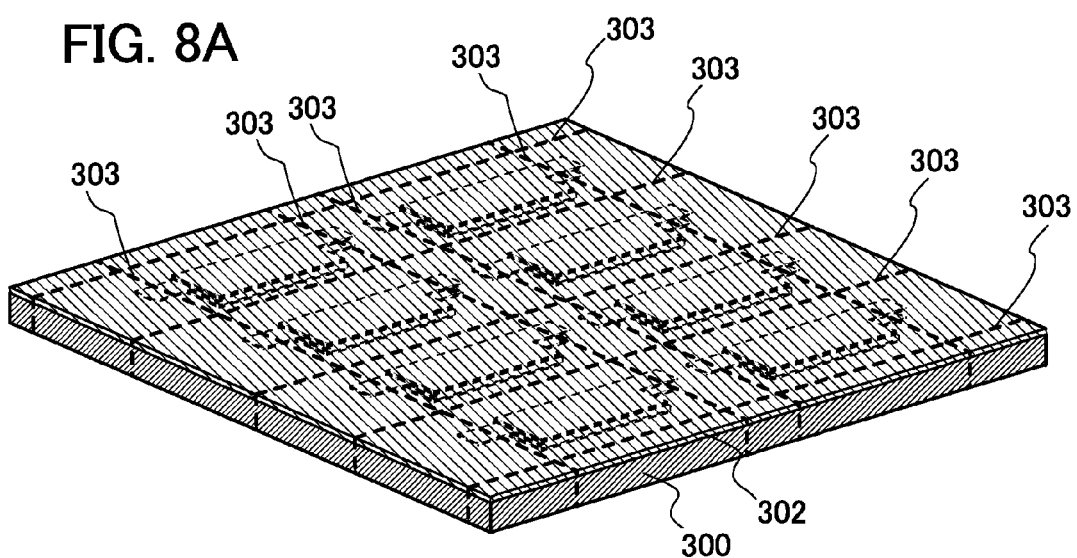
FIGS. 8A to 8E are views illustrating a method for manufacturing a power storage device.

Next, the exterior body 300 and the lid 302 are cut with a dicer to be divided into parts each surrounding the stack body 200. The exterior body 300 and the lid 302 can be divided into the parts each surrounding the stack body 200 by being cut along a plurality of dicing lines 303 as illustrated in FIG. 8A.

Figure 8B:
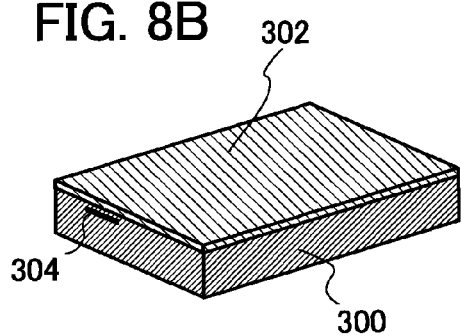
Figure 8C:
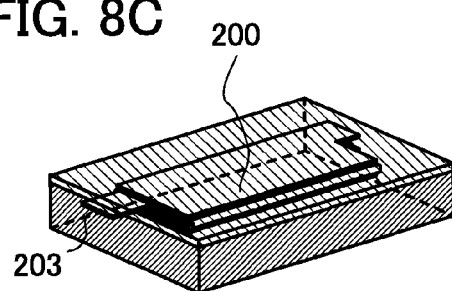

In this division step, part of the positive electrode and part of the negative electrode are also cut so that edge portions of the positive electrode and the negative electrode which are included in the stack body 200 are exposed at dividing surfaces. One of the divided parts each surrounding the stack body 200 is illustrated in FIGS. 8B and 8C. In FIGS. 8B and 8C, an edge portion 304 of the negative electrode 203 in the stack body 200 is exposed at the dividing surface by the cutting. The same can be said for an edge portion of the positive electrode which is positioned at a surface opposite to the dividing surface.

Figure 8D:
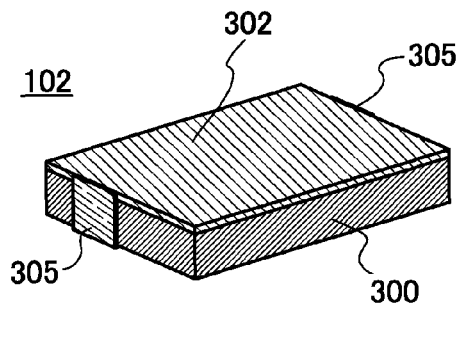
Figure 8E:
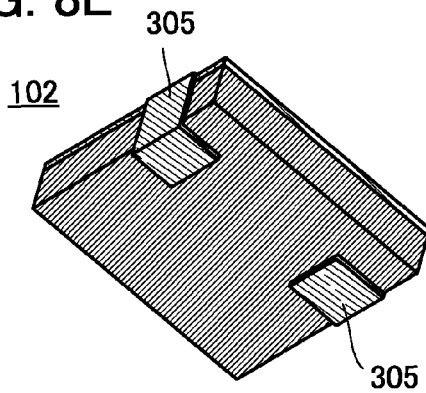

Next, as illustrated in FIGS. 8D and 8E, the tabs 305 are formed for each of the parts each surrounding the stack body 200. Thus, the power storage element 102 is manufactured. The two tabs 305 are formed as the positive electrode tab and the negative electrode tab. The tabs 305 are formed so as to be electrically connected to the edge portion 304 of the negative electrode and the edge portion of the positive electrode, which are exposed by the above-described division. Further, it is preferable that the tabs 305 be each formed so as to be extended from the side surface to the bottom surface of the power storage element 102 so that the tabs 305 are connected to the positive electrode lead and the negative electrode lead which are provided for the flexible substrate (see FIG. 8E).

The tab 305 is formed using a conductive material, and for example, a metal such as gold or a silver paste can be used. The tab 305 is formed to have a desired shape using such a conductive material on the side surface and the bottom surface of the exterior body 300 by a plating method, a sputtering method, a coating method, or the like.

Through the above process, the power storage element 102 is formed. Note that the power storage element 102 excluding part of the tabs which are connected to the positive electrode lead and the negative electrode lead may be additionally molded with a resin or the like. By this molding, the power storage element 102 can have higher reliability.

Figure 9A:
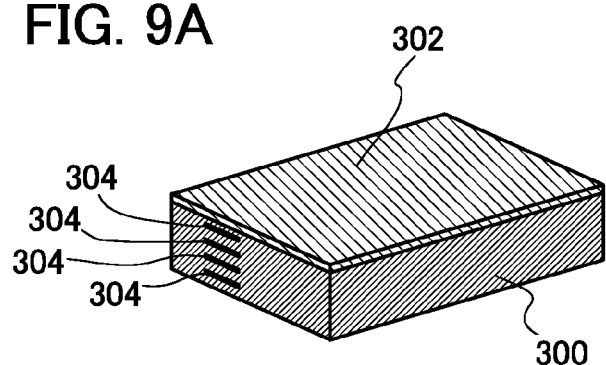
FIGS. 9A to 9C are views illustrating a method for manufacturing a power storage device.
Figure 9B:
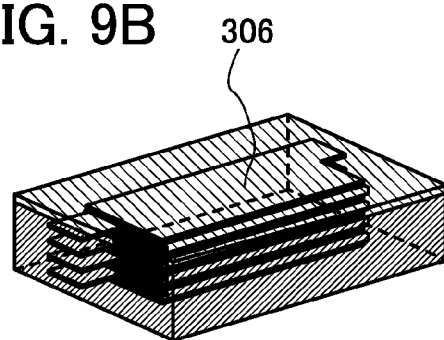
Figure 9C:
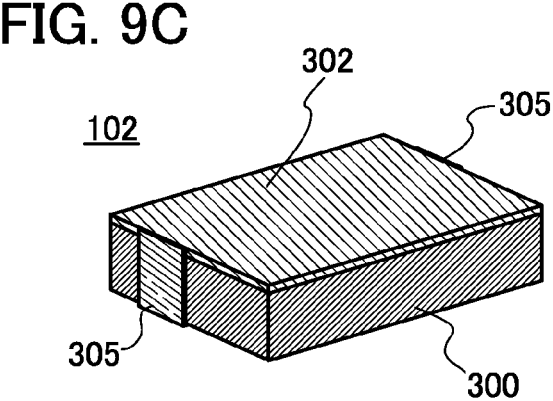

Further, as described above, the stack body 200 may have a multi-layer structure in which three or more layers each including the positive electrode and the negative electrode are stacked. FIGS. 9A to 9C are schematic views illustrating a stack body 306 having a multi-layer structure in which three or more layers each including the positive electrode and the negative electrode are stacked. In the case of using the stack body 306 having a multi-layer structure as illustrated in FIG. 9B, a large number of the edge portions 304 of the positive electrodes and the negative electrodes are exposed at dividing surfaces of the exterior body 300 by a division step (see FIG. 9A). A space between the edge portions of the positive electrodes and a space between the edge portions of the negative electrodes are filled with the part of the lid 302 or the resin. The edge portions of the positive electrodes and the negative electrodes may not overlap with each other so as to be easily surrounded by the part of the lid 302 or the resin (not shown in FIG. 9A). In contrast, the edge portions of the positive electrodes may be combined without any isolations therebetween. The edge portions of the negative electrodes may be combined without any isolations therebetween.

The tabs 305 are provided so as to cover all the exposed edge portions 304. Thus, the power storage element 102 is manufactured.

This embodiment can be implemented in combination with any of the other embodiments as appropriate.

[Embodiment 3]

In this embodiment, structures of the positive electrode and the negative electrode used in the stack bodies which are described in Embodiments 1 and 2, and manufacturing methods thereof are described.

(Positive Electrode and Manufacturing Method Thereof)

Figure 10A:
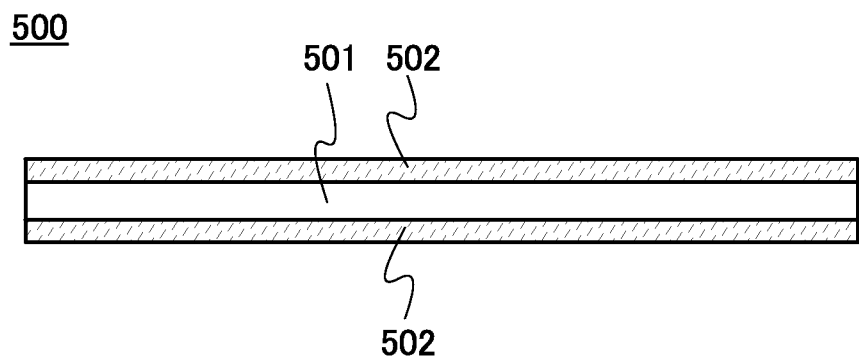
FIGS. 10A to 10C are views illustrating a positive electrode.

First, a positive electrode and a manufacturing method thereof are described. FIG. 10A is a cross-sectional view of a positive electrode 500. In the positive electrode 500, positive electrode mix layers 502 are formed on both surfaces of a positive electrode current collector 501.

For the positive electrode current collector 501, a highly conductive material such as a metal typified by stainless steel, gold, platinum, zinc, iron, copper, aluminum, or titanium, or an alloy thereof can be used. Note that the positive electrode current collector 501 can be formed using an aluminum alloy to which an element which improves heat resistance, such as silicon, titanium, neodymium, scandium, or molybdenum, is added. Further alternatively, the positive electrode current collector 501 may be formed using a metal element which forms silicide by reacting with silicon. Examples of the metal element which forms silicide by reacting with silicon include zirconium, titanium, hafnium, vanadium, niobium, tantalum, chromium, molybdenum, tungsten, cobalt, nickel, and the like. The positive electrode current collector 501 can have a foil-like shape, a plate-like shape (sheet-like shape), a net-like shape, a punching-metal shape, an expanded-metal shape, or the like as appropriate.

As the positive electrode active material in the positive electrode mix layer 502, a material into and from which lithium ions can be inserted and extracted can be used; for example, a lithium-containing composite oxide with an olivine crystal structure, a layered rock-salt crystal structure, or a spinel crystal structure can be used.

As the lithium-containing composite oxide with an olivine crystal structure, a composite oxide represented by a general formula $LiMPO_4$ (M is one or more of Fe(II), Mn(II), Co(II), and Ni(II)) can be given. Typical examples of the general formula $LiMPO_4$ include $LiFePO_4$, $LiNiPO_4$, $LiCoPO_4$, $LiMnPO_4$, $LiFe_aNi_bPO_4$, $LiFe_aCo_bPO_4$, $LiFe_aMn_bPO_4$, $LiNi_aCo_bPO_4$, $LiNi_aMn_bPO_4$ (a+b≤1, 0<a<1, and 0<b<1), $LiFe_cNi_dCo_ePO_4$, $LiFe_cNi_dMn_ePO_4$, $LiNi_cCo_dM$-$n_ePO_4$ (c+d+e≤1, 0<c<1, 0<d<1, and 0<e<1), $LiFe_fNi_gCo_hMn_iPO_4$ (f+g+h+i≤1, 0<f<1, 0<g<1, 0<h<1, and 0<i<1), and the like.

$LiFePO_4$ is particularly preferable because it meets requirements with balance for a positive electrode active material, such as safety, stability, high capacity density, high potential, and existence of lithium ions that can be extracted in initial oxidation (charging).

Examples of the lithium-containing composite oxide with a layered rock-salt crystal structure include lithium cobalt oxide ($LiCoO_2$); $LiNiO_2$; $LiMnO_2$; $Li_2MnO_3$; an NiCo-based lithium-containing composite oxide (a general formula thereof is $LiNi_xCo_{1-x}O_2$ (0<x<1)) such as $LiNi_{0.8}Co_{0.2}O_2$; an NiMn-based lithium-containing composite oxide (a general formula thereof is $LiNi_xMn_{1-x}O_2$ (0<x<1)) such as $LiNi_{0.5}Mn_{0.5}O_2$; and an NiMnCo-based lithium-containing composite oxide (also referred to as NMC, and a general formula thereof is $LiNi_xMn_yCo_{1-x-y}O_2$ (x>0, y>0, x+y<1)) such as $LiNi_{1/3}Mn_{1/3}Co_{1/3}O_2$. Moreover, $Li(Ni_{0.8}Co_{0.15}Al_{0.05})O_2$, $Li_2MnO_3$-$LiMO_2$ (M=Co, Ni, or Mn), and the like can be given.

$LiCoO_2$ is particularly preferable because it has high capacity, is more stable in the air than $LiNiO_2$, and is more thermally stable than $LiNiO_2$, for example.

Examples of the lithium-containing composite oxide with a spinel crystal structure include $LiMn_2O_4$, $Li_{1+x}Mn_{2-x}O_4$, $Li(MnAl)_2O_4$, $LiMn_{1.5}Ni_{0.5}O_4$, and the like.

A lithium-containing composite oxide with a spinel crystal structure including manganese, such as $LiMn_2O_4$, is preferably mixed with a small amount of lithium nickel oxide (e.g., $LiNiO_2$ or $LiNi_{1-x}MO_2$ (M=Co, Al, or the like)), in which case elution of manganese and decomposition of an electrolyte are suppressed, for example.

As the positive electrode active material, a composite oxide represented by a general formula $Li_{(2-j)}MSiO_4$ (M is one or more of Fe(II), Mn(II), Co(II), and Ni(II); 0≤j≤2) can be used. Typical examples of the general formula $Li_{(2-j)}MSiO_4$ include $Li_{(2-j)}FeSiO_4$, $Li_{(2-j)}NiSiO_4$, $Li_{(2-j)}CoSiO_4$, $Li_{(2-j)}MnSiO_4$, $Li_{(2-j)}Fe_kNi_lSiO_4$, $Li_{(2-j)}Fe_kCo_lSiO_4$, $Li_{(2-j)}Fe_kMn_lSiO_4$, $Li_{(2-j)}Ni_kCo_lSiO_4$, $Li_{(2-j)}Ni_kMn_lSiO_4$ (k+l≤1, 0<k<1, and 0<l<1), $Li_{(2-j)}Fe_mNi_nCo_qSiO_4$, $Li_{(2-j)}Fe_mNi_nMn_qSiO_4$, $Li_{(2-j)}Ni_mCo_nMn_qSiO_4$ (m+n+q≤1, 0<m<1, 0<n<1, and 0<q<1), $Li_{2-j}Fe_rNi_sCo_tMn_uSiO_4$ (r+s+t+u≤1, 0<r<1, 0<s<1, 0<t<1, and 0<u<1), and the like.

Further, as the positive electrode active material, a nasicon compound represented by a general formula $A_xM_2(XO_4)_3$ (A=Li, Na, or Mg; M=Fe, Mn, Ti, V, Nb, or Al; and X=S, P, Mo, W, As, or Si) can be used. Examples of the nasicon compound include $Fe_2(MnO_4)_3$, $Fe_2(SO_4)_3$, $Li_3Fe_2(PO_4)_3$, and the like. Further alternatively, as the positive electrode active material, a compound represented by a general formula $Li_2MPO_4F$, $Li_2MP_2O_7$, or $Li_5MO_4$ (M=Fe or Mn); perovskite fluoride such as $NaF_3$ or $FeF_3$; metal chalcogenide such as $TiS_2$ or $MoS_2$ (sulfide, selenide, or telluride); a lithium-containing composite oxide with an inverse spinel crystal structure such as $LiMVO_4$; a vanadium oxide based material (e.g., $V_2O_5$, $V_6O_{13}$, and $LiV_3O_8$); a manganese oxide based material; an organic sulfur based material; or the like can be used.

In the case where carrier ions are alkali metal ions other than lithium ions, alkaline-earth metal ions, beryllium ions, or magnesium ions, the following may be used for the positive electrode mix layer 502: a compound or a composite oxide obtained by substituting an alkali metal (e.g., sodium or potassium), an alkaline-earth metal (e.g., calcium, strontium, or barium), beryllium, or magnesium for lithium in the lithium compound or the lithium-containing composite oxide.

The positive electrode mix layers 502 are not necessarily formed in direct contact with both surfaces of the positive electrode current collector 501. The following functional layers may be formed using a conductive material such as a metal between the positive electrode current collector 501 and the positive electrode mix layer 502: an adhesion layer for increasing the adhesion between the positive electrode current collector 501 and the positive electrode mix layer 502; a planarization layer for reducing the roughness of the surface of the positive electrode current collector 501; a heat radiation layer; a stress relaxation layer for reducing the stress on the positive electrode current collector 501 or the positive electrode mix layer 502; or the like.

Figure 10B:
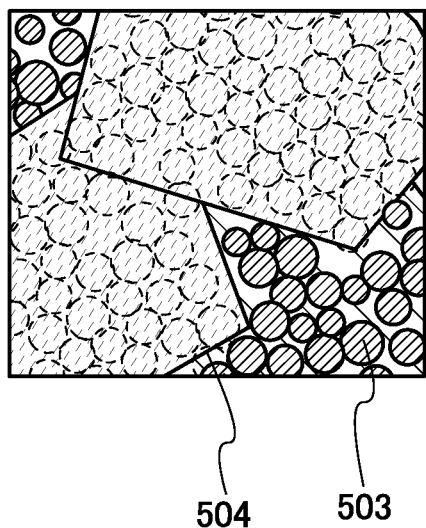

FIG. 10B is a plan view of the positive electrode mix layer 502 including particulate positive electrode active materials 503 capable of occluding and releasing carrier ions, and graphenes 504 which cover a plurality of the positive electrode active materials 503 and at least partly surround the plurality of the positive electrode active materials 503. The different graphenes 504 cover surfaces of the plurality of the positive electrode active materials 503. Note that the positive electrode active materials 503 may partly be exposed.

Note that graphene in this specification includes single-layer graphene and multilayer graphene including two to hundred layers. Single-layer graphene refers to a sheet of one atomic layer of carbon molecules having π bonds. Graphene oxide refers to a compound formed by oxidation of such graphene. Further, in the case where graphene is formed by reduction of graphene oxide, oxygen included in the graphene oxide is not entirely released and partly remains in the graphene. When the graphene contains oxygen, the proportion of oxygen is higher than or equal to 2 atomic % and lower than or equal to 20 atomic %, preferably higher than or equal to 3 atomic % and lower than or equal to 15 atomic %.

In the case where graphene obtained by reduction of graphene oxide is multilayer graphene, the interlayer distance between graphenes is greater than or equal to 0.34 nm and less than or equal to 0.5 nm, preferably greater than or equal to 0.38 nm and less than or equal to 0.42 nm, more preferably greater than or equal to 0.39 nm and less than or equal to 0.41 nm. In general graphite, the interlayer distance between single-layer graphenes is 0.34 nm. Since the interlayer distance between the graphenes used for the power storage device of one embodiment of the present invention is longer than that in general graphite, carrier ions can easily transfer between the graphenes in multilayer graphene.

The particle size of the positive electrode active material 503 is preferably greater than or equal to 20 nm and less than or equal to 100 nm. Note that the particle size of the positive electrode active material 503 is preferably smaller because electrons transfer in the positive electrode active materials 503.

Sufficient characteristics can be obtained even when surfaces of the positive electrode active materials 503 are not covered with a graphite layer; however, it is preferable to use both the graphene and the positive electrode active material covered with a graphite layer because carriers hop between the positive electrode active materials and current flows.

Figure 10C:
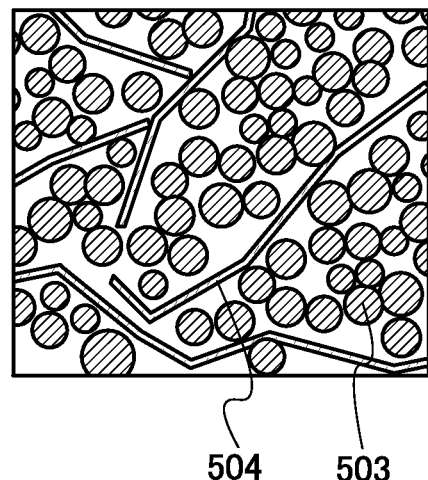

FIG. 10C is a cross-sectional view of a part of the positive electrode mix layer 502 in FIG. 10B. The positive electrode mix layer 502 includes the positive electrode active materials 503 and the graphenes 504 which cover a plurality of the positive electrode active materials 503. The graphenes 504 are observed to have linear shapes in the cross-sectional view. A plurality of the positive electrode active materials are at least partly surrounded with one graphene or a plurality of the graphenes or sandwiched between a plurality of the graphenes. That is, the plurality of positive electrode active materials exist within one graphene or among plural graphenes. Note that the graphene has a bag-like shape, and the plurality of particles of the positive electrode active materials are surrounded with the bag-like portion in some cases. In addition, part of the positive electrode active materials is not covered with the graphenes and exposed in some cases.

The desired thickness of the positive electrode mix layer 502 is determined to be greater than or equal to 20 µm and less than or equal to 100 µm. It is preferable to adjust the thickness of the positive electrode mix layer 502 as appropriate so that a crack and flaking are not caused.

Note that the positive electrode mix layer 502 may contain a conductive additive, for example, acetylene black particles having a volume 0.1 times to 10 times as large as that of the graphene or carbon particles having a one-dimensional expansion such as carbon nanofibers.

As an example of the positive electrode active material 503, a material whose volume is expanded by occlusion of ions serving as carriers is given. When such a material is used, the positive electrode mix layer gets vulnerable and is partly collapsed by charging and discharging, resulting in lower reliability of a power storage device. However, even when the volume of the positive electrode active materials is expanded by charge/discharge, since the graphenes cover the periphery of the positive electrode active materials, dispersion of the positive electrode active materials and the breakdown of the positive electrode mix layer can be prevented. That is to say, the graphene or multilayer graphene has a function of maintaining the bond between the positive electrode active materials even when the volume of the positive electrode active material fluctuates by charging and discharging.

The graphene 504 is in contact with a plurality of the positive electrode active materials 503 and serves also as a conductive additive. Further, the graphene 504 has a function of holding the positive electrode active materials 503 capable of occluding and releasing carrier ions. Thus, a binder does not have to be mixed into the positive electrode mix layer. Accordingly, the amount of the positive electrode active materials in the positive electrode mix layer can be increased, which allows an increase in discharge capacity of the power storage element.

Next, a method for forming the positive electrode mix layers 502 is described.

Slurry containing particulate positive electrode active materials and graphene oxide is formed. Then, the slurry is applied to the both surfaces of the positive electrode current collector 501. After that, heating is performed in a reducing atmosphere for reduction treatment so that the positive electrode active materials are baked and part of oxygen is released from graphene oxide to form openings in graphene. Note that oxygen in the graphene oxide is not entirely released and partly remains in the graphene.

Through the above steps, the positive electrode mix layers 502 can be formed to have a predetermined shape on the positive electrode current collector 501. Consequently, the positive electrode mix layers 502 have higher conductivity. Graphene oxide has a functional group containing oxygen on its surface, and thus is negatively charged in a polar solvent such as N-methylpyrrolidone (NMP). As a result of being negatively charged, graphene oxide is dispersed. Therefore, the positive electrode active materials contained in the slurry are not easily aggregated, so that the particle size of the positive electrode active material can be prevented from increasing due to baking. Thus, the transfer of electrons in the positive electrode active materials is facilitated, resulting in an increase in conductivity of the positive electrode mix layers 502.

After being formed on the positive electrode current collector 501, the positive electrode mix layers 502 are rolled with a roller press machine, whereby the positive electrode 500 is formed.

(Negative Electrode and Manufacturing Method Thereof)

Next, a negative electrode and a manufacturing method thereof are described with reference to FIG. 11A.

Figure 11A:
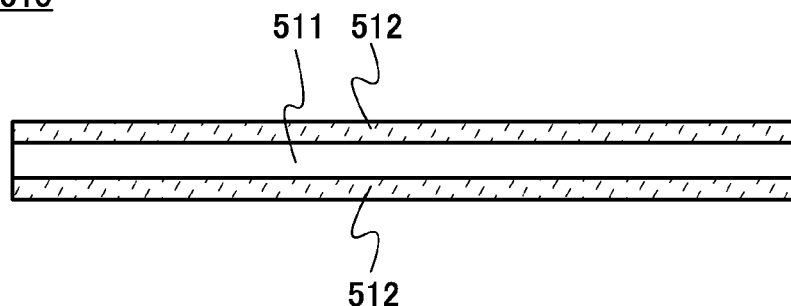
FIGS. 11A to 11D are views illustrating a negative electrode.

As illustrated in FIG. 11A, a negative electrode 510 includes a negative electrode current collector 511, and negative electrode mix layers 512 provided on both surfaces of the negative electrode current collector 511.

The negative electrode current collector 511 is formed using a highly conductive material such as metal. As the material having high conductivity, for example, stainless steel, iron, aluminum, copper, nickel, or titanium can be used. The negative electrode current collector 511 can have a foil shape, a plate shape (sheet shape), a net shape, a punching-metal shape, an expanded-metal shape, or the like as appropriate.

The negative electrode mix layers 512 are provided on the both surfaces of the negative electrode current collector 511. As a negative electrode active material used for the negative electrode mix layers 512, a material which can dissolve and precipitate lithium or a material in/from which lithium ions can be inserted and extracted can be used. For example, a lithium metal, a carbon-based material, and an alloy-based material can be given.

It is preferable to use a lithium metal because the oxidation-reduction potential is low (lower than that of the standard hydrogen electrode by 3.045 V), and the specific capacities per weight and volume are high (3860 mAh/g and 2062 mAh/cm$^3$, respectively).

As a carbon-based material, graphite, graphitizable carbon (soft carbon), non-graphitizable carbon (hard carbon), a carbon nanotube, a graphene, carbon black, or the like can be given.

As graphite, mesocarbon microbeads (MCMB), artificial graphite such as coke artificial graphite or pitch-based artificial graphite, or natural graphite such as spheroidizing natural graphite can be given.

Graphite has a potential (0.1 V to 0.3 V vs. Li$^+$/Li) which is substantially as low as a lithium metal when a lithium ion is inserted into the graphite (at the time when lithium-graphite intercalation compound is formed). Thus, a lithium ion battery can have high operating voltage. Further, it is preferable to use graphite because it has advantages such as a relatively large capacity per unit volume, a little increase in volume, inexpensiveness, and higher safety than a lithium metal.

As a negative electrode active material, an alloy-based material which enables charge-discharge reaction by alloying and dealloying reaction with a lithium metal can be used. For example, a material including at least one of Al, Si, Ge, Sn, Pb, Sb, Bi, Ag, Zn, Cd, In, Ga, and the like can be given. Such elements have higher capacity than carbon. In particular, silicon has a theoretical capacity of 4200 mAh/g, which is significantly high. For this reason, silicon is preferably used as the negative electrode active material. Examples of the alloy-based material using such elements include SiO, Mg$_2$Si, Mg$_2$Ge, SnO, SnO$_2$, Mg$_2$Sn, SnS$_2$, V$_2$Sn$_3$, FeSn$_2$, CoSn$_2$, Ni$_3$Sn$_2$, Cu$_6$Sn$_5$, Ag$_3$Sn, Ag$_3$Sb, Ni$_2$MnSb, CeSb$_3$, LaSn$_3$, La$_3$Co$_2$Sn$_7$, CoSb$_3$, InSb, SbSn, and the like.

Alternatively, as the negative electrode active material, oxide such as titanium dioxide (TiO$_2$), lithium titanium oxide (Li$_4$Ti$_5$O$_{12}$), lithium-graphite intercalation compound (Li$_x$C$_6$), niobium pentoxide (Nb$_2$O$_5$), tungsten oxide (Wo$_2$), molybdenum oxide (MoO$_2$), or the like can be used.

Further alternatively, as the negative electrode active material, Li$_{3-x}$M$_x$N (M=Co, Ni, or Cu) with a Li$_3$N structure, which is nitride of lithium and a transition metal, can be used. For example, Li$_{2.6}$Co$_{0.4}$N$_3$ is preferable because of high charge and discharge capacity (900 mAh/g).

Nitride of lithium and a transition metal is preferably used, in which case lithium ions are included in the negative electrode active material, and thus the negative electrode active material can be used in combination with a material for a positive electrode active material which does not include lithium ions, such as V$_2$O$_5$ or Cr$_3$O$_8$. Note that in the case of using a material including lithium ions as the positive electrode active material, the nitride of lithium and a transition metal can be used for the negative electrode active material by extracting lithium ions in advance.

Alternatively, a material which causes a conversion reaction can be used as the negative electrode active material. For example, a transition metal oxide with which an alloying reaction with lithium is not caused, such as cobalt oxide (CoO), nickel oxide (NiO), or iron oxide (FeO), may be used for the negative electrode active material. As a material which causes a conversion reaction, an oxide such as Fe$_2$O$_3$, CuO, Cu$_2$O, RuO$_2$, or Cr$_2$O$_3$; sulfide such as CoS$_{0.89}$, NiS, or CuS; nitride such as Zn$_3$N$_2$, Cu$_3$N, or Ge$_3$N$_4$; phosphide such as NiP$_2$, FeP$_2$, or CoP$_3$; and fluoride such as FeF$_3$ or BiF$_3$ can be given. Note that the fluoride given above has a high potential, and thus may also be used as a positive electrode active material.

Germanium, silicon, lithium, and aluminum have a higher theoretical capacity than graphite, when they are compared with each other as the negative electrode active materials. When the theoretical capacity is high, charge and discharge can be performed sufficiently even in a small area, which contributes to reduction in cost and size of the power storage element or the power storage device.

In this embodiment, the negative electrode mix layer 512 may be formed in such a manner that a conductive additive and a binder are added to the negative electrode active material, and the materials are ground, mixed, and baked.

As another example of the method for forming the negative electrode 510, as in the positive electrode 500, graphene may be introduced into the negative electrode mix layer 512 in the negative electrode 510. As a result of this, the bond between the negative electrode active materials can be maintained even when the negative electrode active materials are expanded or contracted by charge/discharge. Further, the graphene also serves as a conductive additive.

In the case where graphite is used as the negative electrode active material, for example, NMP in which a vinylidene fluoride-based polymer such as polyvinylidene fluoride is dissolved is mixed as a binder with graphite powder, whereby slurry is formed. Then, the slurry is applied to one of or both the surfaces of the negative electrode current collector 511, and dried. In the case where only one surface of the negative electrode current collector 511 is subjected to this coating step, the same step is repeated so that the negative electrode mix layer is formed on the other surface. After that, rolling with a roller press machine is performed, whereby the negative electrode 510 is formed.

In the case where silicon is used as the negative electrode active material, the negative electrode mix layer is easily flaked if thin-film silicon is simply formed on the negative electrode current collector 511 because the volume of silicon quadruples due to occlusion of carrier ions. Therefore, silicon needs to be processed into a shape other than a thin-film shape, such as a particle shape, a whisker-like shape, or a nanowire shape.

An example of using a negative electrode active material with a particle shape or a whisker-like shape is described below with reference to FIGS. 11A to 11D.

FIG. 11A is a cross-sectional view of the negative electrode 510. In the negative electrode, the negative electrode mix layers 512 are formed on both surfaces of the negative electrode current collector 511. The negative electrode mix layers 512 include at least a negative electrode active material and may further include a binder, a conductive additive, and/or graphene.

Figure 11B:
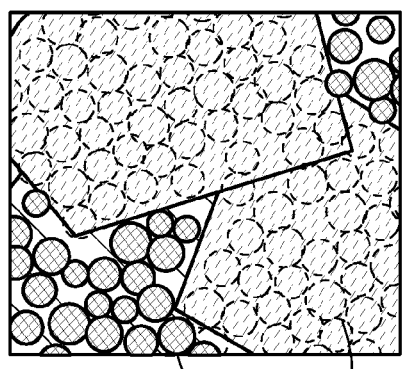

FIG. 11B is a plan view of a part of the negative electrode mix layer 512. The negative electrode mix layer 512 includes particulate negative electrode active materials 513 and the graphenes 514 which cover a plurality of the negative electrode active materials 513 and at least partly surround the plurality of the negative electrode active materials 513. The different graphenes 514 cover surfaces of the plurality of the negative electrode active materials 513 in the negative electrode mix layer 512 in the plan view. The negative electrode active materials 513 may partly be exposed.

Figure 11C:
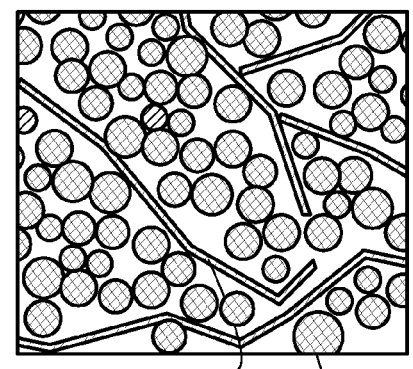

FIG. 11C is a cross-sectional view of a part of the negative electrode mix layer 512 in FIG. 11B. FIG. 11C illustrates the negative electrode active materials 513 and the graphenes 514 covering a plurality of the negative electrode active materials 513 in the negative electrode mix layer 512 in the plan view. The graphenes 514 are observed to have linear shapes in the cross-sectional view. One graphene or a plurality of the graphenes overlap with a plurality of the negative electrode active materials 513, or the plurality of the negative electrode active materials 513 are at least partly surrounded with one graphene or a plurality of the graphenes. Note that the graphene 514 has a bag-like shape, and a plurality of the negative electrode active materials are at least partly surrounded with the bag-like portion in some cases. The graphene 514 partly has openings where the negative electrode active materials 513 are exposed in some cases.

The desired thickness of the negative electrode mix layer 512 is determined to be greater than or equal to 20 μm and less than or equal to 100 μm.

The negative electrode mix layer 512 may contain a known conductive additive such as acetylene black particles having a volume 0.1 to 10 times as large as that of the graphene, or carbon particles having a one-dimensional expansion (e.g., carbon nanofibers), and/or a known binder such as polyvinylidene fluoride.

The negative electrode mix layer 512 may be predoped with lithium in such a manner that a lithium layer is formed on a surface of the negative electrode mix layer 512 by a sputtering method. Alternatively, lithium foil is provided on the surface of the negative electrode mix layer 512, whereby the negative electrode mix layer 512 can be predoped with lithium. Particularly in the case where the graphenes 504 are formed in the positive electrode mix layer 502 of the positive electrode 500 after the lithium secondary battery is assembled, the negative electrode mix layer 512 is preferably predoped with lithium.

As an example of the negative electrode active material 513, a material whose volume is expanded by occlusion of carrier ions is given. When such a material is used, the negative electrode mix layer gets vulnerable and is partly collapsed by charge and discharge, resulting in lower reliability (e.g., inferior cycle characteristics) of the power storage device. However, the graphene 514 covering the periphery of the negative electrode active materials 513 in the negative electrode in the power storage device of one embodiment of the present invention can prevent the negative electrode active materials 513 from being pulverized and can prevent the negative electrode mix layer 512 from being collapsed, even when the volume of the negative electrode active materials 513 is increased/decreased due to charge/discharge. That is to say, the graphene 514 included in the negative electrode in the power storage element of one embodiment of the present invention has a function of maintaining the bond between the negative electrode active materials 513 even when the volume of the negative electrode active materials 513 is increased/decreased due to charge/discharge. Thus, the use of the negative electrode 510 allows an improvement in durability of the power storage element.

That is to say, a binder does not have to be used in forming the negative electrode mix layer 512, or only a slight amount of a binder is needed. Accordingly, the proportion of the negative electrode active materials in the negative electrode mix layer with certain weight (certain volume) can be increased, leading to an increase in charge and discharge capacity per unit weight (unit volume) of the electrode.

The graphene 514 has conductivity and is in contact with a plurality of the negative electrode active materials 513; thus, it also serves as a conductive additive. Thus, a conductive additive does not have to be used in forming the negative electrode mix layer 512, or only a slight amount of a conductive additive is needed. Accordingly, the proportion of the negative electrode active materials in the negative electrode mix layer with certain weight (certain volume) can be increased, leading to an increase in charge and discharge capacity per unit weight (unit volume) of the electrode.

A sufficient conductive path (conductive path of carrier ions) is formed efficiently in the negative electrode mix layer 512 containing the graphene 514, so that the negative electrode mix layer 512 and the negative electrode 510 have high conductivity. Accordingly, the capacity of the negative electrode active material 513 in the power storage element including the negative electrode 510, which is almost equivalent to the theoretical capacity, can be utilized efficiently; thus, the charge capacity can be sufficiently high.

Note that the graphene 514 also functions as a negative electrode active material capable of occluding and releasing carrier ions, leading to an increase in charge capacity of the negative electrode 510.

Next, a method for forming the negative electrode mix layer 512 illustrated in FIGS. 11B and 11C is described.

Slurry containing the particulate negative electrode active materials 513 and graphene oxide is formed. Specifically, the particulate negative electrode active materials 513 and a dispersion liquid containing graphene oxide are mixed to form the slurry.

Then, the slurry is applied to the negative electrode current collector 511. Next, drying is performed in a vacuum for a certain period of time to remove a solvent from the slurry applied to the negative electrode current collector 511. After that, rolling with a roller press machine is performed.

Then, the graphene oxide is electrochemically reduced with electric energy or thermally reduced by heat treatment to form the graphene 514. Through the above process, the negative electrode mix layers 512 can be formed on both surfaces of the negative electrode current collector 511, whereby the negative electrode 510 can be formed.

Figure 11D:
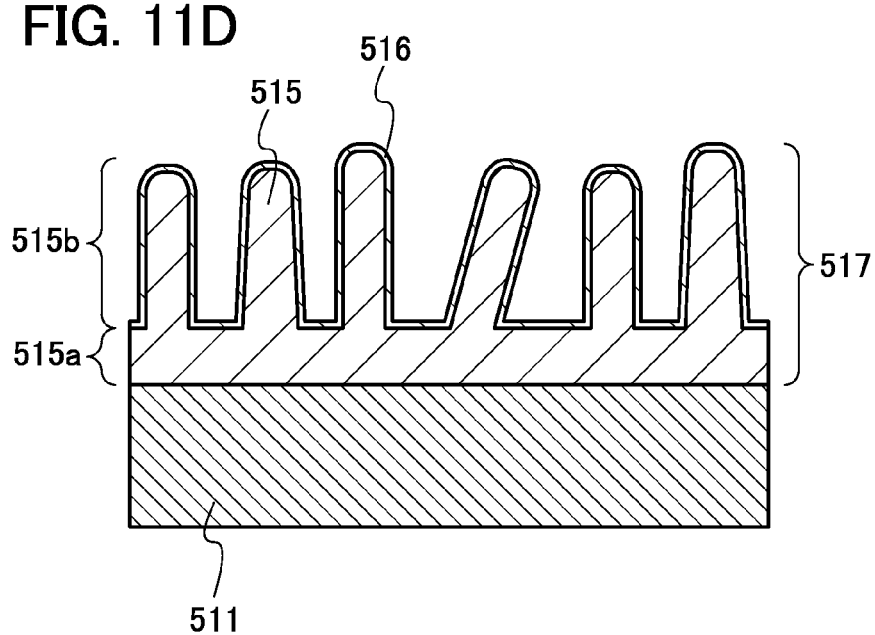

Next, a structure of a negative electrode in FIG. 11D is described.

FIG. 11D is a cross-sectional view of a negative electrode where a negative electrode mix layer 517 is formed on the negative electrode current collector 511. The negative electrode mix layer 517 includes a negative electrode active material 515 having an uneven surface and graphene 516 covering a surface of the negative electrode active material 515.

The uneven negative electrode active material 515 includes a common portion 515a and a projected portion 515b extending from the common portion 515a. The projected portion 515b can have a columnar shape such as a cylinder shape or a prism shape, or a needle shape such as a cone shape or a pyramid shape as appropriate. The top of the projected portion may be curved. The negative electrode active material 515 is a negative electrode active material capable of occluding and releasing carrier ions (typically, lithium ions). Note that the common portion 515a and the projected portion 515b may be formed using either the same material or different materials. The negative electrode active material 515 is not necessarily provided with the common portion 515a, and may have only the projected portion 515b.

When silicon is used as the negative electrode active material 515 in the negative electrode illustrated in FIG. 11D, the graphene 516 covering the periphery of the negative electrode active material 515 can prevent the negative electrode active material 515 from being pulverized and can prevent the negative electrode mix layer 517 from being collapsed, even when the volume of the negative electrode active material 515 is increased/decreased due to charge/discharge.

When a surface of the negative electrode mix layer is in contact with an electrolyte contained in a power storage device, the electrolyte and the negative electrode active material react with each other, so that a film is formed on a surface of the negative electrode. The film is considered necessary to relieve the reaction between the negative electrode and the electrolyte for stabilization. However, when the thickness of the film is increased, carrier ions are less likely to be occluded in the negative electrode, leading to problems such as a reduction in conductivity of carrier ions between the electrode and the electrolyte and a waste of the electrolyte.

The graphene 516 coating the surface of the negative electrode active material 515 can prevent an increase in thickness of the film, so that a decrease in charge and discharge capacity can be prevented.

Another structure of the uneven negative electrode active material 515 can be formed in such a manner that a projection portion is formed on the negative electrode current collector 511 as a part of the negative electrode current collector 511, and the negative electrode active material with a thin film shape is provided to cover the projection portion. With the structure, the projection portion which is the part of the negative electrode current collector 511 functions as a core of the negative electrode active material with a thin film shape, so that the strength of the negative electrode active material can be increased. Thus, the structure is useful particularly in the case where the negative electrode active material is silicon, which is significantly expanded and contracted due to occlusion and release of carrier ions.

Next, a method for forming the negative electrode mix layer 517 in FIG. 11D is described.

The uneven negative electrode active materials 515 are provided on both surfaces of the negative electrode current collector 511 by a printing method, an ink-jet method, a CVD method, or the like. Alternatively, a negative electrode active material having a film shape is formed by a coating method, a sputtering method, an evaporation method, or the like, and then is selectively removed, so that the uneven negative electrode active materials 515 are provided on the both surfaces of the negative electrode current collector 511.

Then, the uneven negative electrode active material 515 is coated with a dispersion liquid containing graphene oxide. As a method for applying the dispersion liquid containing graphene oxide, the method described above may be employed as appropriate.

After a solvent in the dispersion liquid containing graphene oxide is removed, the graphene oxide is electrochemically reduced with electric energy to form the graphene 516. Alternatively, the graphene oxide may be thermally reduced with thermal energy to form the graphene 516. Further alternatively, the graphene oxide may be chemically reduced with a reducing agent to form the graphene 516. The graphene 516 may be formed by a combination of these reduction methods.

When the graphene is thus formed with the use of the dispersion liquid containing graphene oxide, the surface of the uneven negative electrode active material 515 can be coated with the graphene 516 with an even thickness.

Note that the uneven negative electrode active material 515 (hereinafter referred to as silicon whiskers) formed of silicon can be provided on the negative electrode current collector 511 by an LPCVD method using silane, silane chrolide, silane fluoride, or the like as a source gas.

The silicon whiskers may be amorphous. When amorphous silicon whiskers are used for the negative electrode mix layer 517, the volume is less likely to be changed due to occlusion and release of carrier ions (e.g., stress caused by expansion in volume is relieved). For this reason, the silicon whiskers and the negative electrode mix layer 517 can be prevented from being pulverized and collapsed, respectively, due to repeated cycles of charge and discharge; accordingly, a power storage device can have further improved cycle characteristics.

Alternatively, the silicon whiskers may be crystalline. In this case, the crystalline structure having excellent conductivity and carrier ion mobility is in contact with the current collector in a wide range of area. Therefore, it is possible to further improve the conductivity of the entire negative electrode, which enables charging and discharge to be performed at much higher speed; accordingly, a power storage device whose charge-discharge capacity is improved can be manufactured.

Still alternatively, the silicon whisker may include a core, which is a crystalline region, and an outer shell covering the core, which is an amorphous region.

The amorphous outer shell has a characteristic that the volume is less likely to be changed due to occlusion and release of carrier ions (e.g., stress caused by expansion in volume is relieved). In addition, the crystalline core, which has excellent conductivity and carrier ion mobility, has a characteristic that the rate of occluding carrier ions and the rate of releasing carrier ions are high per unit mass. Thus, when the silicon whisker having the core and the outer shell is used for the negative electrode mix layer 517, charging and discharging can be performed at high speed; accordingly, a power storage device whose charge and discharge capacity and cycle characteristics are improved can be manufactured.

This embodiment can be implemented in combination with any of the other embodiments as appropriate.

(Embodiment 4)

The power storage device of one embodiment of the present invention can be used for power supplies of a variety of electronic devices which can be operated with power.

Specific examples of electronic devices each utilizing the power storage device of one embodiment of the present invention are as follows: display devices of televisions, monitors, and the like, lighting devices, desktop personal computers and laptop personal computers, word processors, image reproduction devices which reproduce still images and moving images stored in recording media such as digital versatile discs (DVDs), portable CD players, portable radios, tape recorders, headphone stereos, stereos, table clocks, wall clocks, cordless phone handsets, transceivers, portable wireless devices, mobile phones, car phones, portable game machines, toys, calculators, portable information terminals, electronic notebooks, e-book readers, electronic translators, audio input devices, video cameras, digital still cameras, electric shavers, high-frequency heating appliances such as microwave ovens, electric rice cookers, electric washing machines, electric vacuum cleaners, water heaters, electric fans, hair dryers, air-conditioning systems such as air conditioners, humidifiers, and dehumidifiers, dishwashers, dish dryers, clothes dryers, futon dryers, electric refrigerators, electric freezers, electric refrigerator-freezers, freezers for preserving DNA, flashlights, electrical tools, smoke detectors, and medical equipment such as dialyzers. Further, industrial equipment such as guide lights, traffic lights, belt conveyors, elevators, escalators, industrial robots, power storage systems, and power storage devices for leveling the amount of power supply and smart grid can be given. In addition, moving objects driven by electric motors using electric power from the power storage devices are also included in the category of electronic devices. Examples of the moving objects are electric vehicles (EV), hybrid electric vehicles (HEV) which include both an internal-combustion engine and a motor, plug-in hybrid electric vehicles (PHEV), tracked vehicles in which caterpillar tracks are substituted for wheels of these vehicles, motorized bicycles including motor-assisted bicycles, motorcycles, electric wheelchairs, golf carts, boats, ships, submarines, helicopters, aircrafts, rockets, artificial satellites, space probes, planetary probes, and spacecrafts.

In the electronic devices, the power storage device of one embodiment of the present invention can be used as a main power supply for supplying enough electric power for almost the whole power consumption. Alternatively, in the electronic devices, the power storage device of one embodiment of the present invention can be used as an uninterruptible power supply which can supply electric power to the electronic devices when the supply of electric power from the main power supply or a commercial power supply is stopped. Still alternatively, in the electronic devices, the power storage device of one embodiment of the present invention can be used as an auxiliary power supply for supplying electric power to the electronic devices at the same time as the power supply from the main power supply or a commercial power supply.

Figure 12:
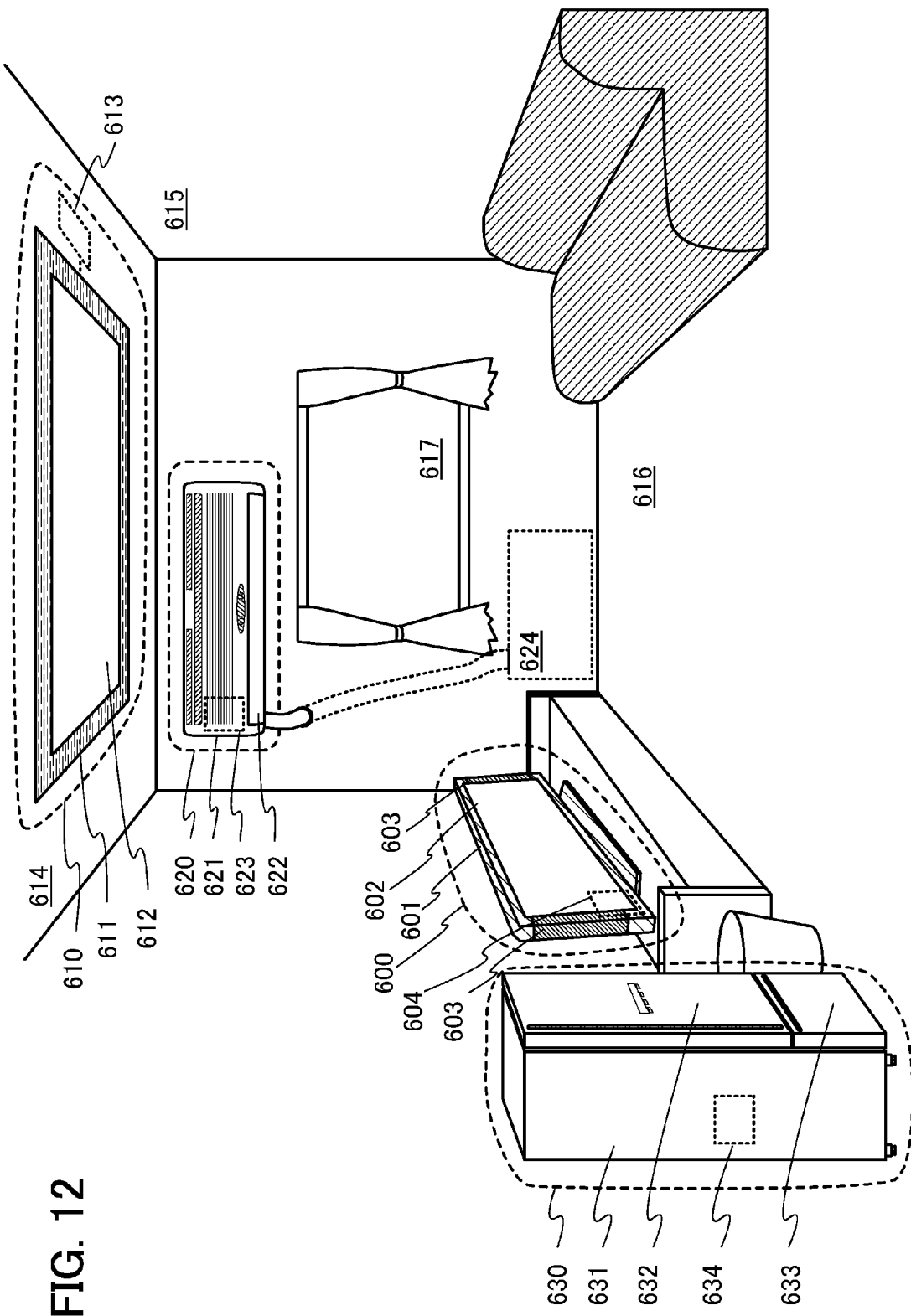
FIG. 12 is a view illustrating electronic devices.

FIG. 12 illustrates specific structures of the electronic devices. In FIG. 12, a display device 600 is an example of an electronic device including a power storage device 604 of one embodiment of the present invention. Specifically, the display device 600 corresponds to a display device for TV broadcast reception and includes a housing 601, a display portion 602, speaker portions 603, and the power storage device 604. The power storage device 604 of one embodiment of the present invention is provided in the housing 601. The display device 600 can receive electric power from a commercial power supply. Alternatively, the display device 600 can use electric power stored in the power storage device 604. Thus, the display device 600 can be operated with the use of the power storage device 604 of one embodiment of the present invention as an uninterruptible power supply even when electric power cannot be supplied from a commercial power supply due to power failure or the like.

A semiconductor display device such as a liquid crystal display device, a light-emitting device in which a light-emitting element such as an organic EL element is provided in each pixel, an electrophoresis display device, a digital micromirror device (DMD), a plasma display panel (PDP), or a field emission display (FED) can be used for the display portion 602.

Note that the display device includes, in its category, all of information display devices for personal computers, advertisement displays, and the like besides TV broadcast reception.

In FIG. 12, an installation lighting device 610 is an example of an electronic device including a power storage device 613 of one embodiment of the present invention. Specifically, the lighting device 610 includes a housing 611, a light source 612, and the power storage device 613. Although FIG. 12 illustrates the case where the power storage device 613 is provided in a ceiling 614 on which the housing 611 and the light source 612 are installed, the power storage device 613 may be provided in the housing 611. The lighting device 610 can receive electric power from a commercial power supply. Alternatively, the lighting device 8100 can use electric power stored in the power storage device 613. Thus, the lighting device 610 can be operated with the use of the power storage device 613 of one embodiment of the present invention as an uninterruptible power supply even when electric power cannot be supplied from a commercial power supply due to power failure or the like.

Note that although the installation lighting device 610 provided in the ceiling 614 is illustrated in FIG. 12 as an example, the power storage device of one embodiment of the present invention can be used in an installation lighting device provided in, for example, a wall 615, a floor 616, a window 617, or the like other than the ceiling 614. Alternatively, the power storage device can be used in a tabletop lighting device or the like.

As the light source 612, an artificial light source which emits light artificially by using electric power can be used. Specifically, an incandescent lamp, a discharge lamp such as a fluorescent lamp, and light-emitting elements such as an LED and an organic EL element are given as examples of the artificial light source.

In FIG. 12, an air conditioner including an indoor unit 620 and an outdoor unit 624 is an example of an electronic device including a power storage device 623 of one embodiment of the present invention. Specifically, the indoor unit 620 includes a housing 621, an air outlet 622, and the power storage device 623. Although FIG. 12 illustrates the case where the power storage device 623 is provided in the indoor unit 620, the power storage device 623 may be provided in the outdoor unit 624. Alternatively, the power storage devices 623 may be provided in both the indoor unit 620 and the outdoor unit 624. The air conditioner can receive electric power from a commercial power supply. Alternatively, the air conditioner can use electric power stored in the power storage device 623. Particularly in the case where the power storage devices 623 are provided in both the indoor unit 620 and the outdoor unit 624, the air conditioner can be operated with the use of the power storage device 623 of one embodiment of the present invention as an uninterruptible power supply even when electric power cannot be supplied from a commercial power supply due to power failure or the like.

Note that although the split-type air conditioner including the indoor unit and the outdoor unit is illustrated in FIG. 12 as an example, the power storage device of one embodiment of the present invention can be used in an air conditioner in which the functions of an indoor unit and an outdoor unit are integrated in one housing.

In FIG. 12, an electric refrigerator-freezer 630 is an example of an electronic device including a power storage device 634 of one embodiment of the present invention. Specifically, the electric refrigerator-freezer 630 includes a housing 631, a door for a refrigerator 632, a door for a freezer 633, and the power storage device 634. The power storage device 634 is provided in the housing 631 in FIG. 12. The electric refrigerator-freezer 630 can receive electric power from a commercial power supply. Alternatively, the electric refrigerator-freezer 8300 can use electric power stored in the power storage device 634. Thus, the electric refrigerator-freezer 630 can be operated with the use of the power storage device 634 of one embodiment of the present invention as an uninterruptible power supply even when electric power cannot be supplied from a commercial power supply due to power failure or the like.

Note that among the electronic devices described above, a high-frequency heating apparatus such as a microwave oven and an electronic device such as an electric rice cooker require high power in a short time. The tripping of a breaker of a commercial power supply in use of an electronic device can be prevented by using the power storage device of one embodiment of the present invention as an auxiliary power supply for supplying electric power which cannot be supplied enough by a commercial power supply.

In addition, in a time period when electronic devices are not used, particularly when the proportion of the amount of electric power which is actually used to the total amount of electric power which can be supplied from a commercial power supply source (such a proportion referred to as a usage rate of electric power) is low, electric power can be stored in the power storage device, whereby the usage rate of electric power can be reduced in a time period when the electronic devices are used. For example, in the case of the electric refrigerator-freezer 630, electric power can be stored in the power storage device 634 in night time when the temperature is low and the door for a refrigerator 632 and the door for a freezer 633 are not often opened or closed. On the other hand, in daytime when the temperature is high and the door for a refrigerator 632 and the door for a freezer 633 are frequently opened and closed, the power storage device 634 is used as an auxiliary power supply; thus, the usage rate of electric power in daytime can be reduced.

This embodiment can be implemented in combination with any of the other embodiments as appropriate.

(Embodiment 5)

In this embodiment, an example of an electronic device having a curved surface in which the power storage device of one embodiment of the present invention is used will be described with reference to FIGS. 13A and 13B.

Figure 13A:
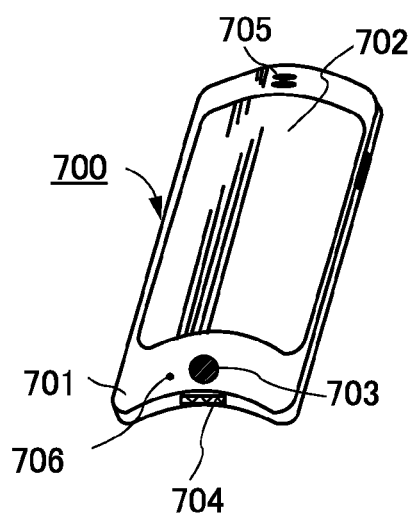
FIGS. 13A and 13B are views each illustrating an electronic device.

FIG. 13A illustrates an example of a mobile phone. A mobile phone 700 includes a display portion 702 incorporated in a housing 701, an operation button 703, an external connection port 704, a speaker 705, a microphone 706, and the like. The mobile phone 700 also includes the power storage device of one embodiment of the present invention.

When the display portion 702 of the mobile phone 700 illustrated in FIG. 13A is touched with a finger or the like, data can be input into the mobile phone 700. Further, operations such as making a call and inputting text can be performed by touching the display portion 702 with a finger or the like.

With the operation button 703, the power can be turned on or off. In addition, types of images displayed on the display portion 702 can be switched; switching images from a mail creation screen to a main menu screen.

The mobile phone 700 in this embodiment includes the flexible power storage device of one embodiment of the present invention. In FIG. 13A, the mobile phone 700 is curved upward in the lateral direction thereof. Thus, the power storage device of one embodiment of the present invention is provided so that the mobile phone 700 has flexibility in the lateral direction thereof. In this manner, the mobile phone can be thin and have a curved shape.

Figure 13B:
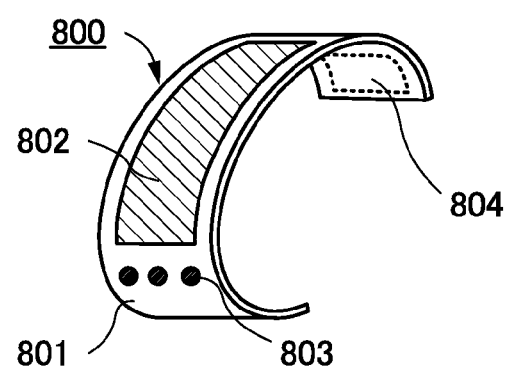

FIG. 13B is an example of a wristband-type display device. A portable display device 800 includes a housing 801, a display portion 802, an operation button 803, and a sending and receiving device 804. The portable display device 800 also includes the power storage device of one embodiment of the present invention.

The portable display device 800 can receive a video signal with the sending and receiving device 804 and can display the received video on the display portion 802. In addition, with the sending and receiving device 8604, the portable display device 800 can send an audio signal to another receiving device.

With the operation button 803, turning on and off the power, switching displayed videos, adjusting volume, and the like can be performed.

The portable display device 800 in this embodiment includes the power storage device having flexibility of one embodiment of the present invention. In FIG. 13B, the portable display device 800 is curved upward in the longitudinal direction thereof. Thus, the power storage device of one embodiment of the present invention is provided so that the portable display device 800 has flexibility in the longitudinal direction thereof (not illustrated). For example, the power storage device of one embodiment of the present invention can be mounted on a back side of the display portion 802 so as to be curved. In this manner, the portable display device which is thin and has a curved surface can be formed.

Note that it is needless to say that one embodiment of the present invention is not limited to the electronic device described above as long as the power storage device of one embodiment of the present invention is included.

This embodiment can be implemented in combination with any of the other embodiments as appropriate.

This application is based on Japanese Patent Application serial no. 2012-094092 filed with the Japan Patent Office on Apr. 17, 2012, the entire contents of which are hereby incorporated by reference.

What is claimed is:

1. A power storage device element comprising:
a first body having a depressed portion;

a second body in the depressed portion and over the first body;
a stack body in the depressed portion between the first body and the second body; and
a first tab outside the first body and the second body,
wherein the stack body includes a plurality of layers,
wherein the plurality of layers each includes a first electrode, a second electrode, and an electrolyte interposed therebetween,
wherein the depressed portion including the stack body is filled with a part of the second body,
wherein a space between edges of the plurality of first electrodes and a space between edges of the plurality of second electrodes are filled with the part of the second body,
wherein edges of the plurality of first electrodes are exposed at a first side surface of the first body, and
wherein the first tab is on and in contact with the first side surface of the first body and electrically connected to the plurality of first electrodes.

2. A power storage device comprising a plurality of the power storage device elements according to claim 1 on a flexible substrate,
wherein the plurality of the power storage device elements are electrically connected by a first lead and a second lead.

3. The power storage device element according to claim 1, wherein the electrolyte is a solid polymer electrolyte.

4. The power storage device element according to claim 1, wherein the second body is formed using a thermoplastic resin, a thermosetting resin, or a photocurable resin.

5. The power storage device element according to claim 1,
wherein a second tab is on and in contact with a second side surface of the first body and electrically connected to the plurality of second electrodes,
wherein the second side surface is positioned opposite to the first side surface.

6. A power storage device element comprising:
a first body having a depressed portion;
a second body in the depressed portion and over the first body;
a stack body in the depressed portion between the first body and the second body; and
a first tab outside the first body and the second body,
wherein the stack body includes a plurality of layers,
wherein the plurality of layers each includes a first electrode, a second electrode, and an electrolyte interposed therebetween,
wherein the depressed portion including the stack body is filled with a part of the second body,
wherein a space between edges of the plurality of first electrodes and a space between edges of the plurality of second electrodes are filled with a part of the first body and a part of second body,
wherein edges of the plurality of first electrodes are exposed at a first side surface of the first body, and
wherein the first tab is on and in contact with the first side surface of the first body and electrically connected to the plurality of first electrodes.

7. A power storage device comprising a plurality of the power storage device elements according to claim 6 on a flexible substrate,
wherein the plurality of the power storage device elements are electrically connected by a first lead and a second lead.

8. The power storage device element according to claim 6, wherein the electrolyte is a solid polymer electrolyte.

9. The power storage device element according to claim 6, wherein the second body is formed using a thermoplastic resin, a thermosetting resin, or a photocurable resin.

10. The power storage device element according to claim 6,
wherein a second tab is on and in contact with a second side surface of the first body and electrically connected to the plurality of second electrodes,
wherein the second side surface is positioned opposite to the first side surface.

11. The power storage device element according to claim 1, wherein the stack body is sealed inside the first body and the second body without spaces between the first body and the stack body and between the stack body and the second body.

12. The power storage device element according to claim 1, wherein the first tab is provided from the first side surface to a bottom surface of the first body so as to have an L shape.

13. The power storage device element according to claim 1, wherein each edge surface of the plurality of first electrodes are on the same surface as the first side surface.

14. The power storage device element according to claim 6, wherein the stack body is sealed inside the first body and the second body without spaces between the first body and the stack body and between the stack body and the second body.

15. The power storage device element according to claim 6, wherein the first tab is provided from the first side surface to a bottom surface of the first body so as to have an L shape.

16. The power storage device element according to claim 6, wherein each edge surface of the plurality of first electrodes are on the same surface as the first side surface.

* * * * *